(12) United States Patent
Toy

(10) Patent No.: US 12,457,229 B2
(45) Date of Patent: Oct. 28, 2025

(54) SYSTEM AND METHOD FOR APPLYING SERVICE TOPOLOGY TO QUANTIFYING NETWORK HEALTH METRICS

(71) Applicant: Verizon Patent and Licensing Inc., Basking Ridge, NJ (US)

(72) Inventor: Mehmet Toy, Allendale, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 228 days.

(21) Appl. No.: 18/164,721

(22) Filed: Feb. 6, 2023

(65) Prior Publication Data

US 2024/0267396 A1    Aug. 8, 2024

(51) Int. Cl.
  *H04L 9/40*    (2022.01)

(52) U.S. Cl.
  CPC ...... *H04L 63/1425* (2013.01); *H04L 63/1441* (2013.01)

(58) Field of Classification Search
  CPC .............. H04L 63/1425; H04L 63/1441
  See application file for complete search history.

(56) References Cited

U.S. PATENT DOCUMENTS

| | | | | |
|---|---|---|---|---|
| 8,990,639 | B1* | 3/2015 | Marr | G06F 11/3672 714/25 |
| 10,554,518 | B1* | 2/2020 | Troy de Freitas | H04L 41/0686 |
| 2007/0242604 | A1* | 10/2007 | Takase | H04J 3/14 370/223 |
| 2020/0162344 | A1* | 5/2020 | Zapponi | H04L 41/044 |
| 2020/0162589 | A1* | 5/2020 | Vijayadharan | H04L 41/16 |
| 2021/0075689 | A1* | 3/2021 | Ramanathan | H04L 41/147 |
| 2023/0070701 | A1* | 3/2023 | Wang | H04L 41/5012 |

* cited by examiner

*Primary Examiner* — Esther B. Henderson

(57) ABSTRACT

An application may be hosted on a device. The application may be configured to: receive a selection of a health metric and a selection of a service topology associated with a service provided by a network to a to a subscriber device; receive configuration information for evaluating the selected health metric for the service topology; receive monitored health information from a network device; evaluate one or more health-weight products or health-weight-security products for the selected health metric and the service topology based on the received monitored health information; obtain a normalized sum of the evaluated health-weight products or the health-weight security products; compare the normalized sum to a threshold; and send an alert or initiate a fix for the service when the sum is greater than the threshold.

20 Claims, 21 Drawing Sheets

1600

SYSTEM AND METHOD FOR APPLYING SERVICE TOPOLOGY TO QUANTIFYING NETWORK HEALTH METRICS

BACKGROUND INFORMATION

Connectivity and cloud operators render data communication services to users within a particular region. For example, a Connectivity Operator may offer Ethernet Line (E-Line) services for providing connectivity to user devices over optical fibers at various locations. A user device may access applications hosted on a cloud through a Cloud Virtual Connection (Cloud VC). In another example, a user device may connect to another user device over an Ethernet Virtual Connection (EVC) of E-Line service.

DETAILED DESCRIPTION OF EXAMPLE EMBODIMENTS

The following detailed description refers to the accompanying drawings. The same reference numbers in different drawings may identify the same or similar elements.

Systems and methods described herein relate to using service topologies (herein also referred to simply as topologies) to represent connectivity and cloud services over various networks and cloud infrastructure to one or more user devices. Once a system obtains a topology for a particular service, the system may apply the topology to calculate or derive other service characteristics, such as health metrics and/or network throughput.

Figure 1:
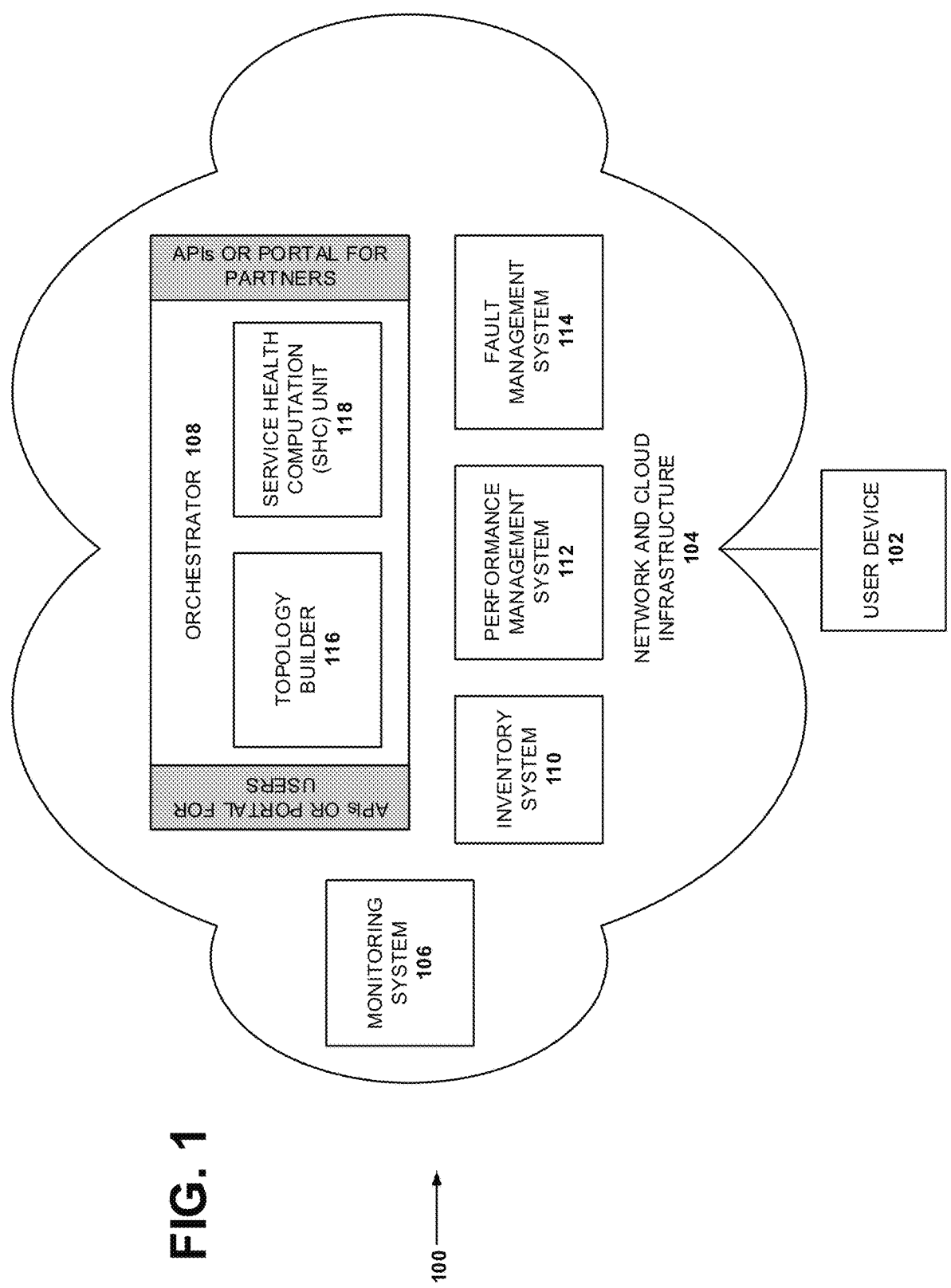
FIG. 1 illustrates an example service environment in which the systems and methods described herein may be implemented.

FIG. 1 shows an overview of the concepts described herein. As shown, a service environment 100 may include a user device 102 (e.g., thousands or millions) and a network and cloud infrastructure 104 (which may be herein also referred to simply as network 104). Network 104 may in turn include a monitoring system 106 (e.g., hundreds or thousands), an orchestrator 108, an inventory system 110, a performance management system 112, and a fault management system 114. Depending on the implementation, service environment 100 may include additional, fewer, different, or a different arrangement of devices and components than those depicted in FIG. 1.

User device 102 may include a communication device capable of Ethernet communication (e.g., over a cable, an optical fiber, etc.), WI-FI® communication, and/or cellular communication. In some implementations, user device 102 may include a particular Radio Access Technology (RAT), such as Fourth Generation (4G) (e.g., Long-Term Evolution (LTE)) RAT, and/or Fifth Generation (5G) New Radio (NR) RAT. Examples of user device 102 include: a customer-premises equipment (CPE) with virtualized components such as a virtual machine (VM)/container and a virtual network function (VNF), such as a set-top-box; a wireless router (e.g., a WI-FI router); a smart phone; a tablet device; a wearable computer device (e.g., a smart watch); a global positioning system (GPS) device; and a laptop computer; a media playing device.

In one implementation, user device 102 may host a client application (e.g., a browser) for accessing one or more services offered by orchestrator 108, performance management system 112, and/or fault management system 114. For example, a user of user device 102 may have user device 102 attach to network 104 and orchestrator 108. In particular, user device 102 may request (e.g., via Application Programming Interface (API) or a portal) orchestrator 108 to build service topologies or determine health metrics for one or more of the service topologies associated with various services, applications, and their related information. The user of user device 102, for example, may use the API or a portal to input various parameters associated with computing health metrics to orchestrator 108. In another example, the user of user device 102 may use the API or a portal to input health thresholds to performance management system 112 and fault management system 114. In addition, the user of user device 102 may use the information provided by orchestrator 108, performance management system 112, and/or fault management system 114 for reconfiguring network and cloud components, initiating repairs and/or recoveries, and/or network optimization.

Network 104 may include one or more networks of various types and a cloud infrastructure. For example, network 104 may include: a Metro Ethernet (e.g., Metropolitan Area Network (MAN)); a Multi-protocol Label Switching (MPLS) network; one or more radio access networks (RANs), such as an LTE RAN and/or a 5G NR RAN, or other advanced radio networks; a core network such as a 5G core network, a 4G core network (e.g., Evolved Packet Core (EPC)), or another type of core network; a local area network (LAN); a wide area network (WAN); an autonomous system (AS) on the Internet; an optical network; a cable television network; a satellite network; a Code Division Multiple Access (CDMA) network; a general packet radio service (GPRS) network; an ad hoc network; a telephone network (e.g., the Public Switched Telephone Network (PSTN); a cellular network; an intranet; a combination of networks; and applications such as virtual network functions (VNFs), cloud-native network functions (CNFs), infrastructure as a service (IaaS), platform as a service (PaaS), etc.

Monitoring system 106 may include devices or software components hosted on network devices or other service components. Monitoring system 106 may monitor and/or collect telemetry information, such as network traffic, latency, jitter, bandwidth, bit error rate, and fault counts. Furthermore monitoring system 106 may provide the telemetry information to performance management system 112 and fault management system 114, periodically, on demand, or in real time. The telemetry information may include network, cloud infrastructure, and application health-related information (herein referred to as health information), such as, for example, failures (e.g., a link failure, a device failure, a network failure, an application crash, etc.), an average downtime per failure, average packet loss, an average Bit Error Rate (BER), violation of user-set or service provider-set set thresholds, violation of a service level agreement (SLA) condition, jitter, latency, congestion, etc. Monitoring system 106 may provide the health information to SHC unit 118.

Orchestrator 108 may coordinate generation of service topologies and computation of service topology parameters, such as service topology health metrics. Orchestrator 108 may receive user and/or partner inputs over external APIs or a portal (shown as APIs or portal for users/partners in FIG. 1), to build topologies, compute health metrics, receive parameters related to computing health metrics (e.g., weights) and provide the built topologies and/or computed health metrics to other network and cloud components.

As shown, orchestrator 108 may include a topology builder 116 and a Service Health Computation unit 118 (also herein referred to as SHC unit 118, SHC application 118 or simply application 118). Although orchestrator 108 may include additional components, they are not illustrated in FIG. 1 (e.g., a component to determine overall traffic volume handled by a service topology).

Topology builder 116 may receive service component information and configuration information from inventory system 110. The configuration information may include, for example, connectivity information and/or other parameters (e.g., device location information, a parameter that indicates whether a device is a node that is a User-to-Network Interface, an External Network-to-Network Interface, or an Application Interface, detailed information about the interfaces such as physical layer parameters, etc.).

Based on the component and configuration information, topology builder 116 may generate service topologies of various services such as E-Line, Software Defined Wide Area Network (SD-WAN), Infrastructure as a Service (IaaS), platform as a Service (PaaS), Network as a Service (NaaS), etc. Topology builder 116 may export the service topologies to SHC unit 118 or to other components external to orchestrator 108 via APIs or a portal.

SHC unit 118 may obtain service topologies from topology builder 116 and health information from monitoring system 106, periodically, on demand, or in real time for service health computation. A user (a user device or a portal) and a partner (a partner device or a portal) may use the service topologies, the health information, and/or other parameters provided via an API or a portal to view or set weights for the service health computation.

Inventory system 110 may include inventory information and configuration information for service components and underlying infrastructure, and other related information. Inventory 110 may receive database updates to its inventory information from orchestrator 108, user devices 102 or other service management systems via internal APIs among management systems and provide the updated inventory information to other management systems via internal APIs. Users or partners may retrieve the inventory information from the inventory system 110 via external APIs or portal.

Performance management system 112 may set performance thresholds such as packet loss and delay for service components, receive telemetry information from monitoring system 106, collect measurements from monitoring system 106 periodically, on-demand, or in real time and calculate performance metrics such as average delay or average packet loss for a given time interval (e.g., one minute, five minutes set by customer, partner, or service administrator). Performance management system 112 may calculate part of health information for SHC unit 118 and orchestrator 108, and upload them to SHC unit 118 via external APIs and/or portal. Based on the collected information, performance management system 112 may detect suboptimal network performance. Upon detecting suboptimal performance, performance management system 112 may reconfigure network and cloud infrastructure components for optimization. In addition, performance management system 112 may send alerts and/or alarms to orchestrator and/or service administrators.

Fault management system 114 may receive telemetry information from monitoring system 106 and notifications and alarms at various levels for anomalies associated with service components, underlying infrastructure, and user devices 102. Fault management system 114 may use the received information to detect network and cloud infrastructure faults, initiate repairs or recovery and forward the necessary information to SHC for its service health computation and orchestrator 108 to inform users/partners and service administrators via external APIs and/or portals.

Figure 2:
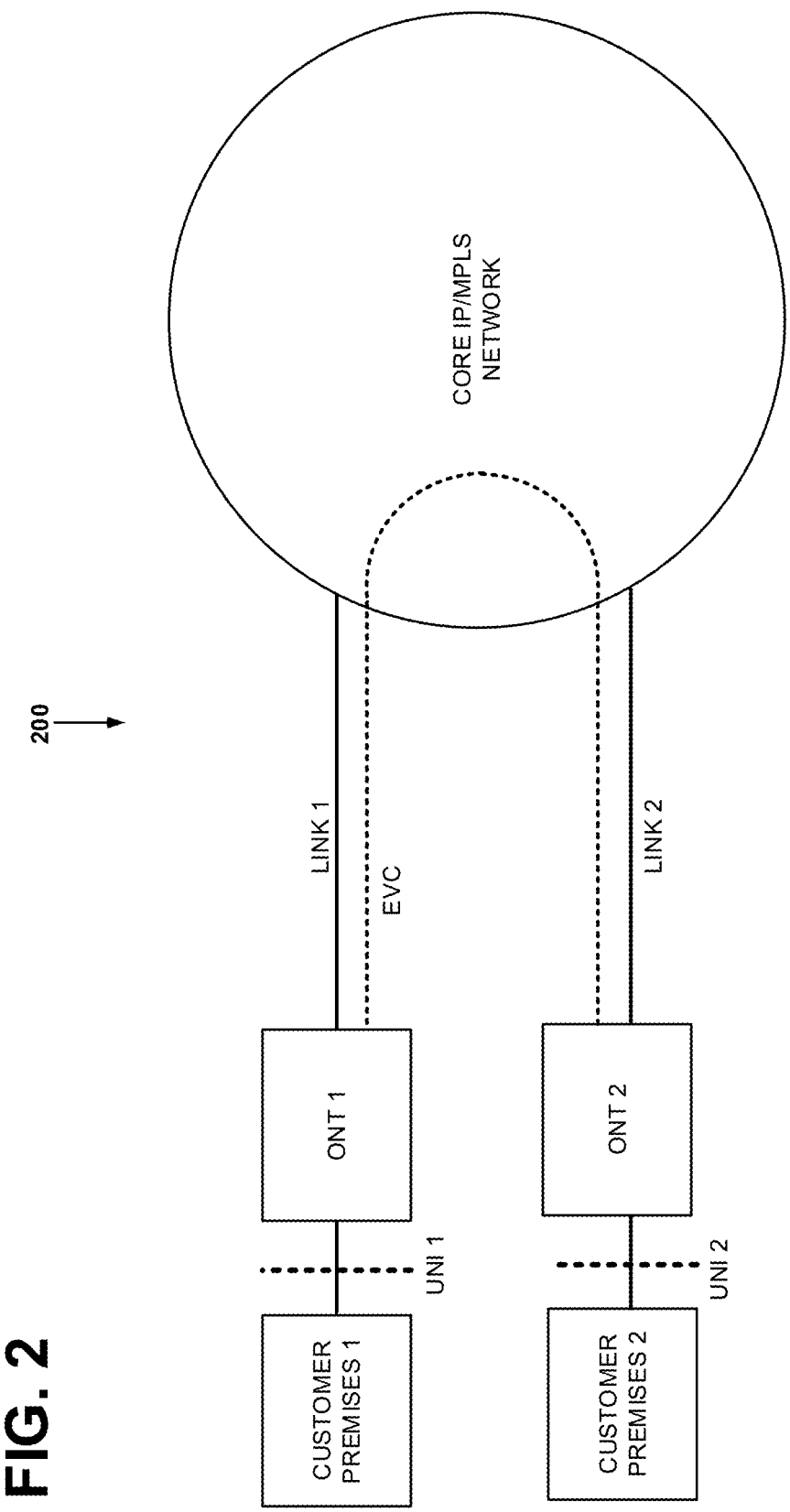
FIG. 2 illustrates an example Ethernet Private Line (EPL), which is an E-Line service, over an access network and a core network, according to an implementation.

FIG. 2 illustrates an example connectivity service configuration that topology builder 116 may represent with a service topology. More specifically, FIG. 2 illustrates an example Ethernet Private Line (EPL) service provided over an core IP/MPLS network. As shown, connectivity service configuration 200 includes customer premises 1 and 2, User Network Interface (UNIs) 1 and 2, optical network terminals (ONTs) 1 and 2, and a core IP/MPLS network. Although connectivity service configuration 200 may include additional components, for clarity, they are not illustrated.

Customer premises 1 and 2 include areas that customers (e.g., a subscriber) of services may occupy. Customer premises 1 and 2 may include user devices, which may connect to the core IP/MPLS network for services. For example, customer premises 1 and 2 may include CPEs.

UNIs 1 and 2 may each include a service interface through which user devices (e.g., devices in customer premises 1 and 2) may connect to devices of the network (e.g., ONT 1 and ONT 2). For example, UNI 1 may include one or more components to facilitate the transmission of information to/from a user device. In one implementation, UNI 1 and 2 may allow user devices to connect to services, such as connectivity services (e.g., Ethernet-Line (E-Line) services, Internet Protocol (IP) services, etc.).

ONTs 1 and 2 terminate optical cable/fiber access links 1 and 2 from the core IP/MPLS network. Access links 1 and 2 may be part of an access network (not shown in FIG. 2). To communicate with one another (e.g., through applications in or services provided by the core IP/MPLS network), user devices in customer premises 1 and 2 may be connected to ONTs 1 and 2 through UNIs 1 and 2, respectively.

The core IP/MPLS network may be part of a service provider network, such as that in network and a cloud infrastructure 104. The core IP/MPLS network may be coupled to an access network, such as a passive optical network (PON), which is not shown in FIG. 2. As noted above, the access network, which is coupled to the core IP/MPLS network, may include ONT 1 and ONT 2.

In FIG. 2, user devices in customer premises 1 and customer premises 2 may receive connectivity services via the core IP/MPLS network. The services may include connectivity services and/or cloud services. The connectivity services may include Carrier Ethernet service, Software Defined-Wide Area Network (SD-WAN) services, Internet services, and/or Layer 1 (L1) services. The cloud services may include connectivity services and application services, such as Multi-cloud Virtual Network services (VNS), IaaS, PaaS, and NaaS.

In FIG. 2, the devices (e.g., CPEs) at UNI 1 and UNI 2 may be connected to one another through Ethernet Virtual Connection (EVC) over Ethernet Private Line (EPL) service. The EVC service includes a logical service that runs through access links 1 and 2 (also referred to access lines 1 and 2) and the core IP/MPLS network, terminating at EVC endpoints (EPs (e.g., CPEs) attached to UNI 1 and UNI 2. The EPL includes the UNIs, the EVC, and the EVC endpoints.

Figure 3A:
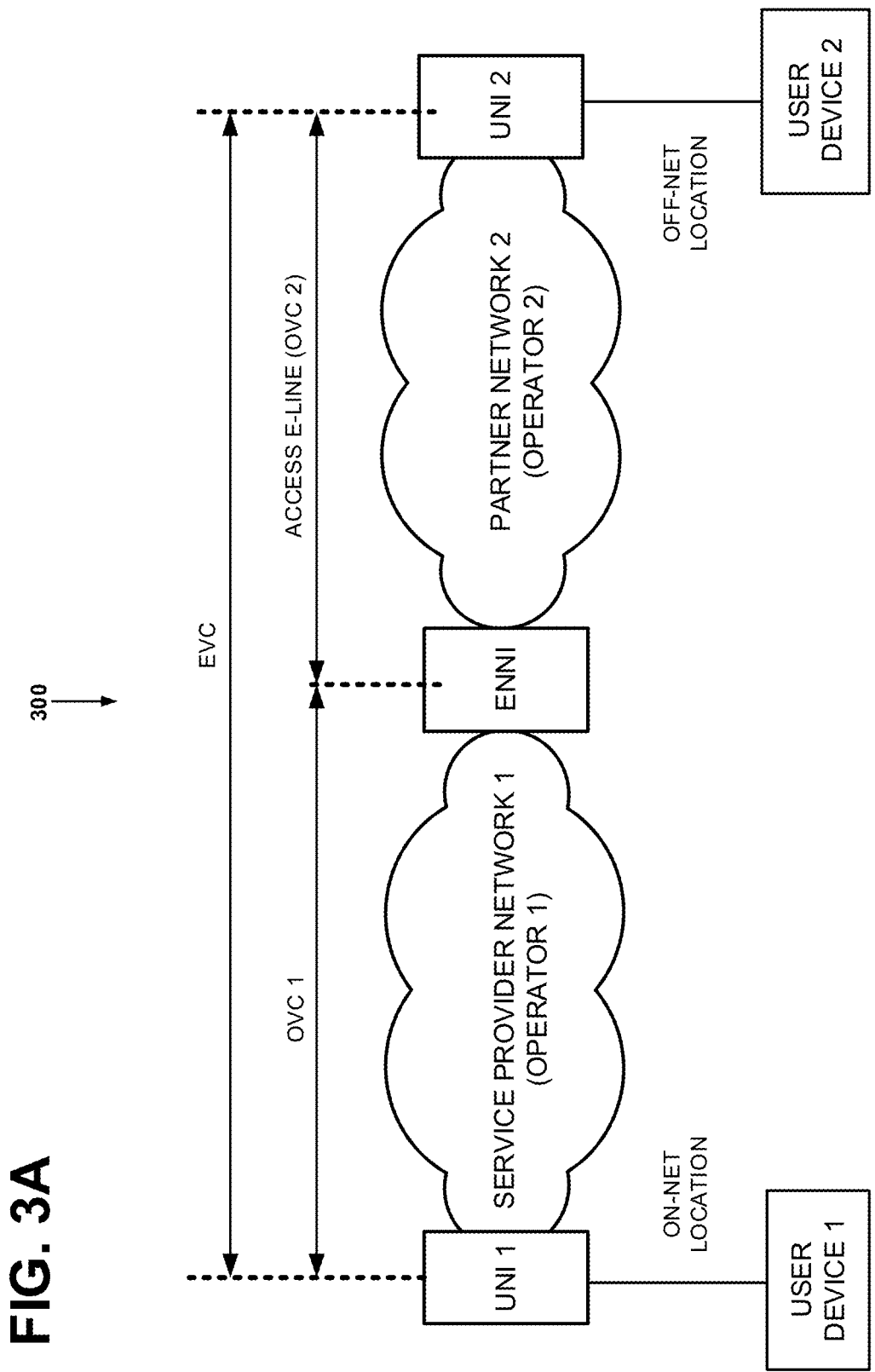
FIGS. 3A and 3B show an Ethernet Line (E-Line) supported by two operators, according to an implementation.
Figure 3B:
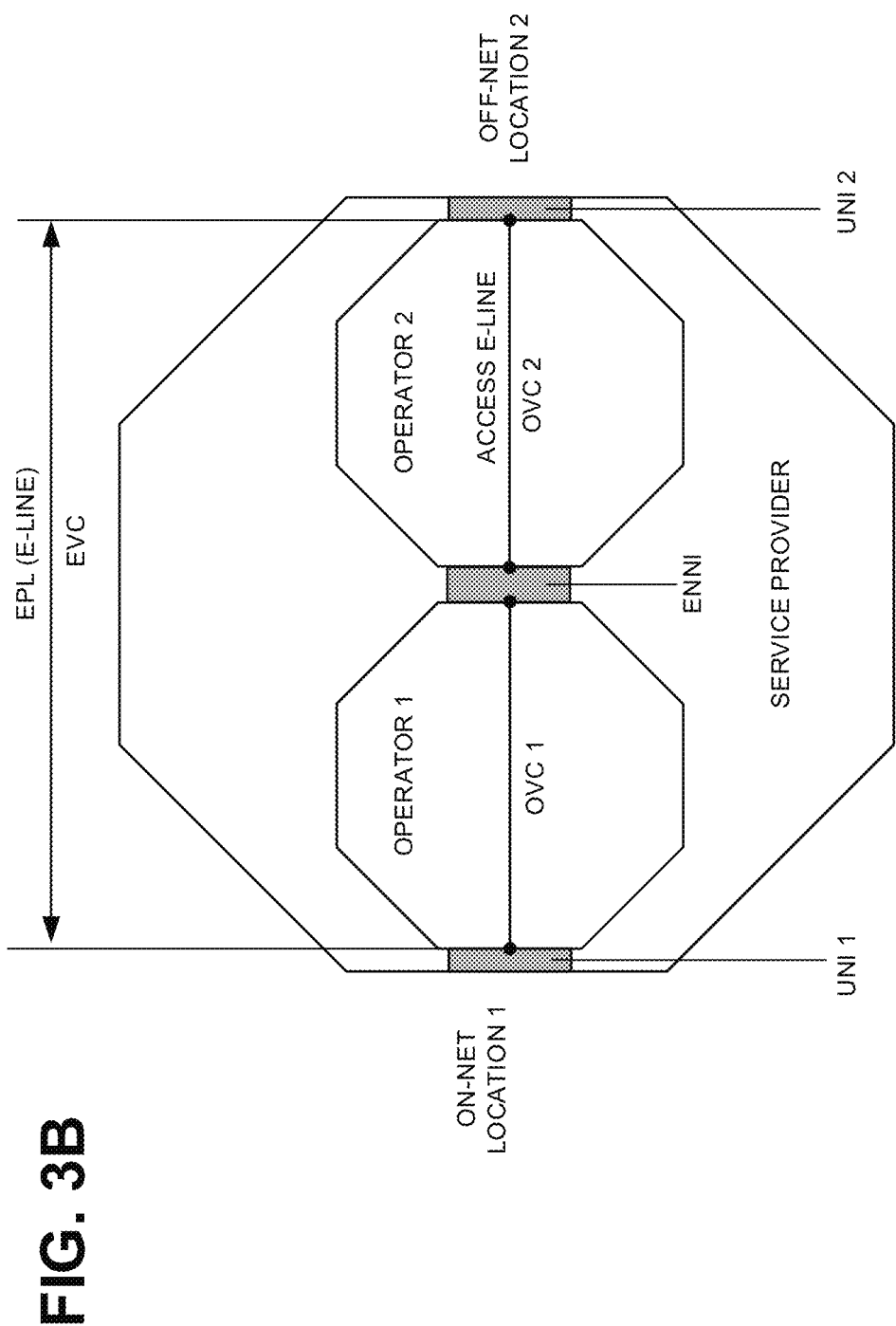

FIGS. 3A and 3B show an Ethernet Line (E-Line) supported by two operators, according to an implementation. Referring to FIG. 3A, network 300 may include user devices 1 and 2, UNIs 1 and 2, service provider network 1 (also referred to herein as operator 1), a partner network 2 (also referred to as operator 2), and an external network-to-network interface (ENNI).

User devices 1 and 2 in FIG. 3A may be similar to the user device 102 of FIG. 1 and/or the user devices that may be included in the customer premises of FIG. 2. However, in FIG. 3A, user device 1 is shown as being at an on-net location, while user device 2 is shown as being at an off-net location. Service provider network 1 and partner network 2 may include similar elements and networks as part of network and cloud infrastructure 104 described above. While network 1 and network 2 may be operated by different entities, a single connectivity service provider may provide the services of both network 1 and network 2. That is, the service provider may operate network 1 but not necessarily network 2.

The ENNI may include one or more network elements that provide interoperability for signals/data transmitted between network 1 and network 2. The ENNI may perform functions such as formatting frames, formatting Protocol Data Units (PDUs) of the application layer and lower layers of the communication, enforcing bandwidth profiles, performing switching, etc.

In FIG. 3A, operators 1 and 2 may support an EPL connectivity service. Thus, an EVC may extend from UNI 1 to UNI 2. An EVC segment in each operator may be referred to as an OVC (Operator Virtual Connection). The service provided by partner network 2 (operator 2) to the service provider network 1 may be referred to as an access E-Line. The access E-Line service may include: the OVC2 endpoint at ENNI; the UNI 2; an OVC 2; and the OVC 2 endpoint at UNI 2. The E-Line service may include the UNIs 1 and 2, the EVC, and the EVC endpoints.

FIG. 3B depicts some of the above description and what is shown in FIG. 3A. Referring to FIG. 3B, the service provider has operator 1 and operator 2 providing OVC 1 and OVC 2. OVC 2 may include the access E-Line, from UNI 1 to ENNI and from ENNI to UNI 2. The overall E-Line may extend from UNI 1 to UNI 2 and comprise OVC 1 and OVC 2. The EPs may include devices at the on-net location and the off-net location.

Figure 4:
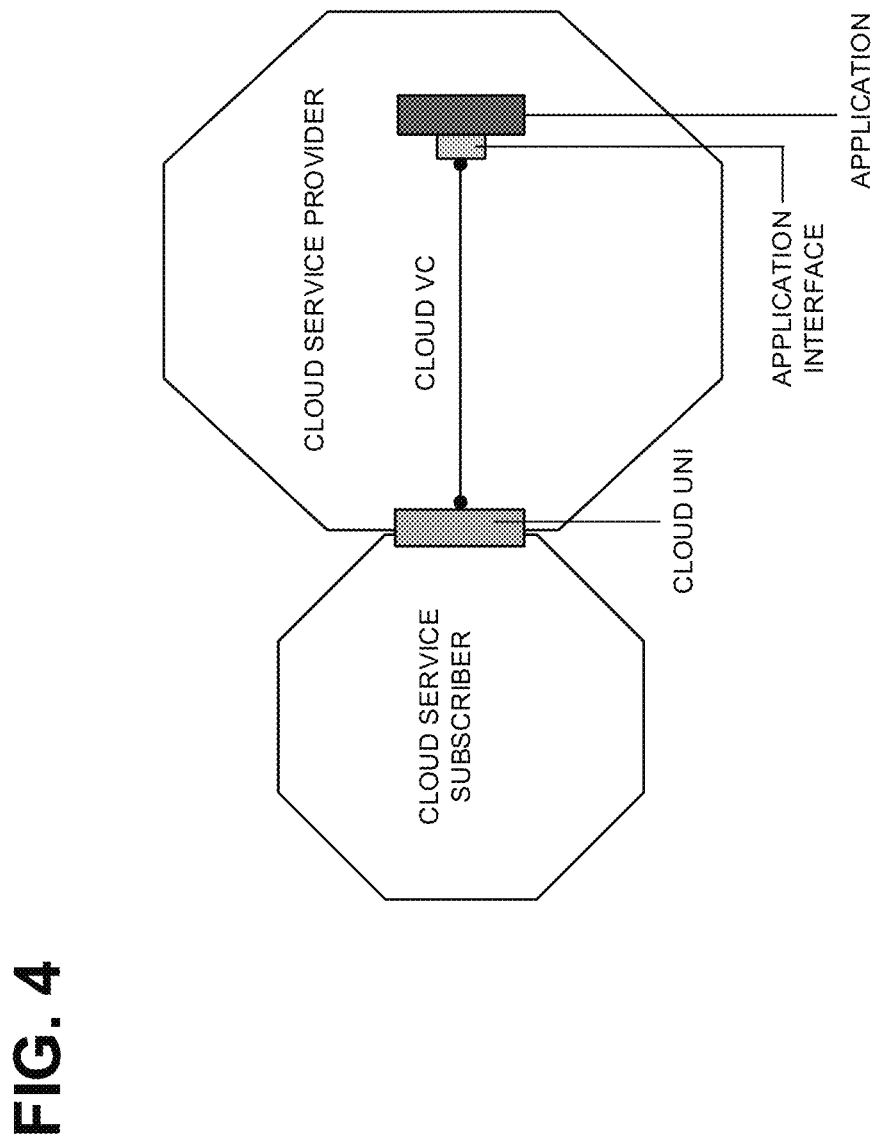
FIG. 4 depicts a Point-to-Point cloud service, according to an implementation.

FIG. 4 depicts a Point-to-Point cloud service. As shown, the elements of the cloud service may include a cloud UNI, an application interface, a cloud virtual connection (VC), and cloud VC EPs. The cloud VC EPs are illustrated as a black dots at the ends of the line that represents the cloud VC.

Figure 5:
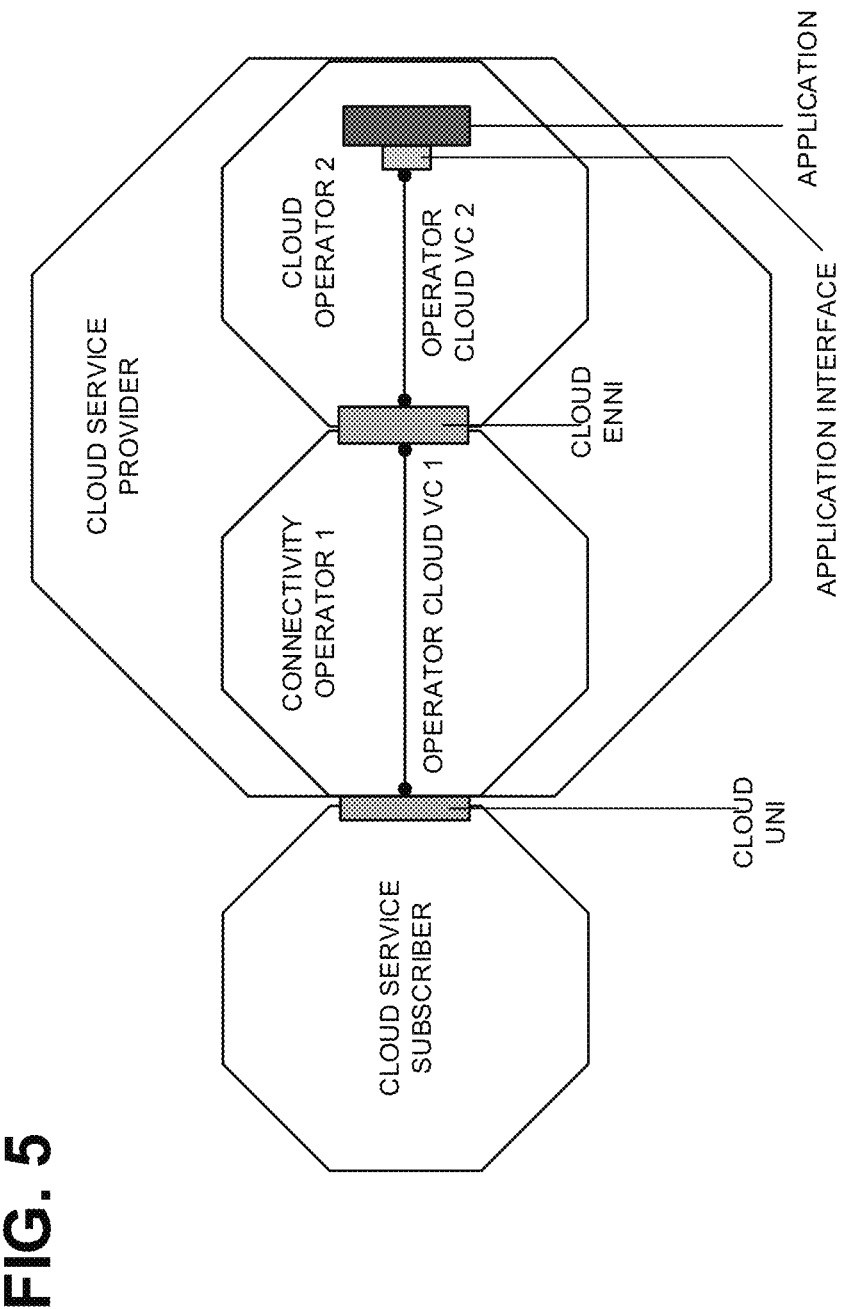
FIG. 5 depicts a cloud service supported by two operators, according to an implementation.

FIG. 5 depicts a cloud service supported by two operators, according to an implementation. As shown, the cloud service provider may include connectivity operator 1 and cloud operator 2, which provide an operator cloud virtual connection (VC) 1 and operator cloud VC 2, respectively. Operator cloud VC 1 may extend from the cloud UNI to the cloud ENNI and operator cloud VC 2 may extend from the ENNI to the application interface coupled to the application.

FIGS. 2, 3A, 3B, 4, and 5 show different services. These services may be represented by a type of graph, herein referred to as a service topology map, or simply as a service topology. As discussed above, topology builder 116 may obtain information pertaining to different service components and their configurations from inventory system 110 to derive service topologies. A service topology may be viewed as an undirected graph whose constituent components are augmented with properties related to one or more services.

Figure 6:
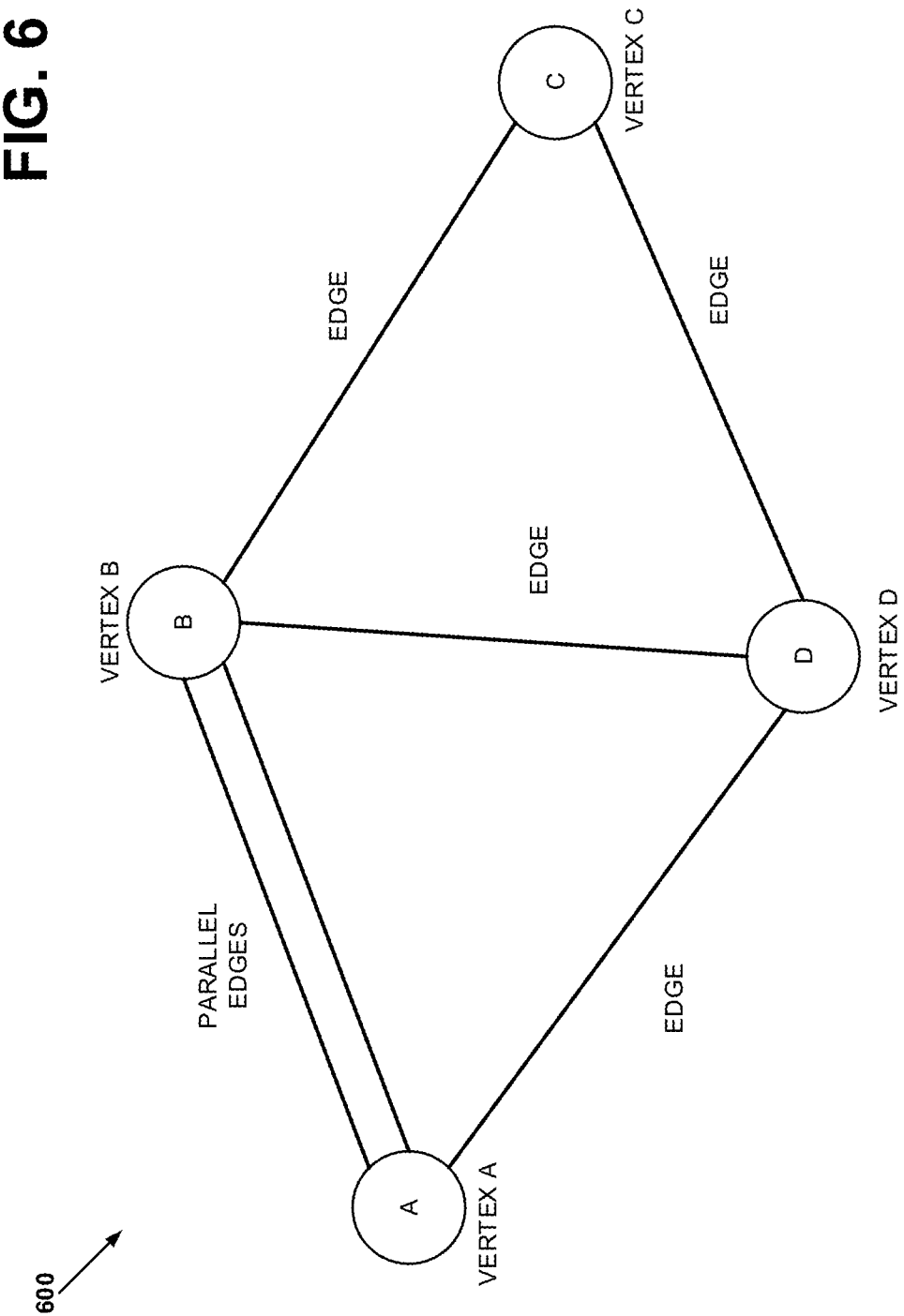
FIG. 6 illustrates an example undirected graph, based on which a service topology may be generated.

FIG. 6 illustrates an example undirected graph 600, based on which service topologies may be generated. An undirected graph may include vertices (also referred to as nodes) and edges. In FIG. 6, graph 600 may include vertices A, B, C, and D, and edges that connect the vertices. A different graph may include additional or fewer vertices and/or edges. When given information about a particular service, SHC unit 118 may generate a service topology as a type of undirected graph, where each node includes a service interface with its location and/or a service connection EP with its service interface, and where each edge includes connections and/or flows between service connection EPs at service interfaces.

An undirected graph (G) may be denoted as G=(V, E)—a mathematical structure where V represents nodes (or vertices) and E represents edges. In a network, elements of V may include switches, routers, or other network elements. In a service topology, V may include service interfaces, such as UNIs, ENNIs and application interfaces with their locations or connection EPs. Elements of E may include links or connections. In FIG. 6, the parallel edges may have the same endpoints (i.e., nodes) and thus form parallel edges. Each node and each edge in G may include or be associated with one or more properties. Each property may be associated with a value (e.g., an alphanumeric string, bits, bytes, a number, etc.). Each property may be static (e.g., a physical link) or dynamic (e.g., bandwidth, service priority, VLAN IDs, IP addresses, rate limiting parameter, load balancers, etc.).

Figure 7:
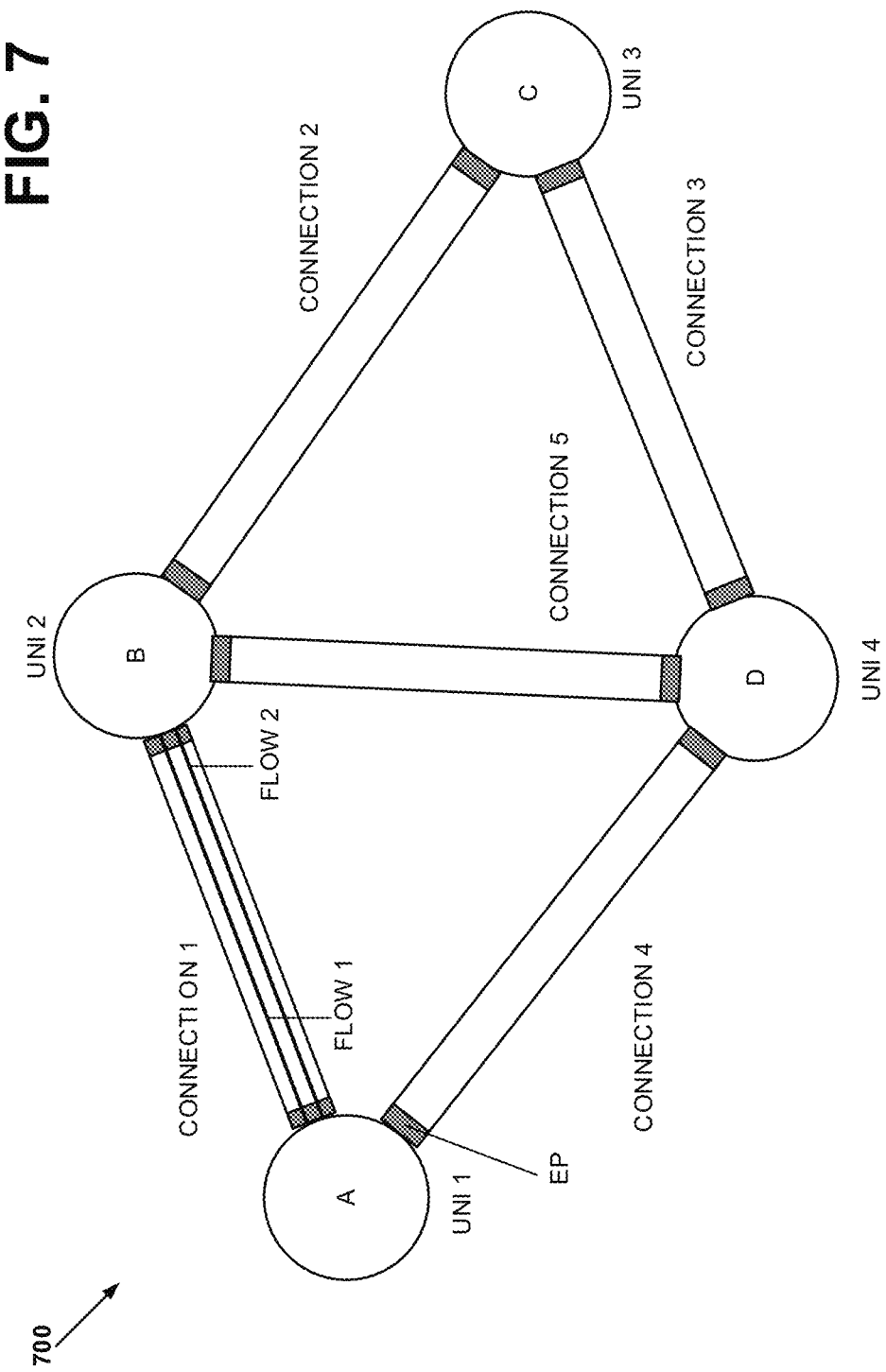
FIGS. 7-12 illustrate example service topologies, according to different implementations.

FIGS. 7-12 show example service topologies, according to different implementations. FIG. 7 shows a service topology 700 with vertices of UNIs 1 through 4 and the edges of service connections 1 through 5, each with an EP (only one EP is labeled). The UNIs and connections may be referred to as service topology components. A service topology component with one or more elastic attributes (i.e., attributes that can be modified dynamically) may be referred to as a service topology elastic component.

Figure 8:
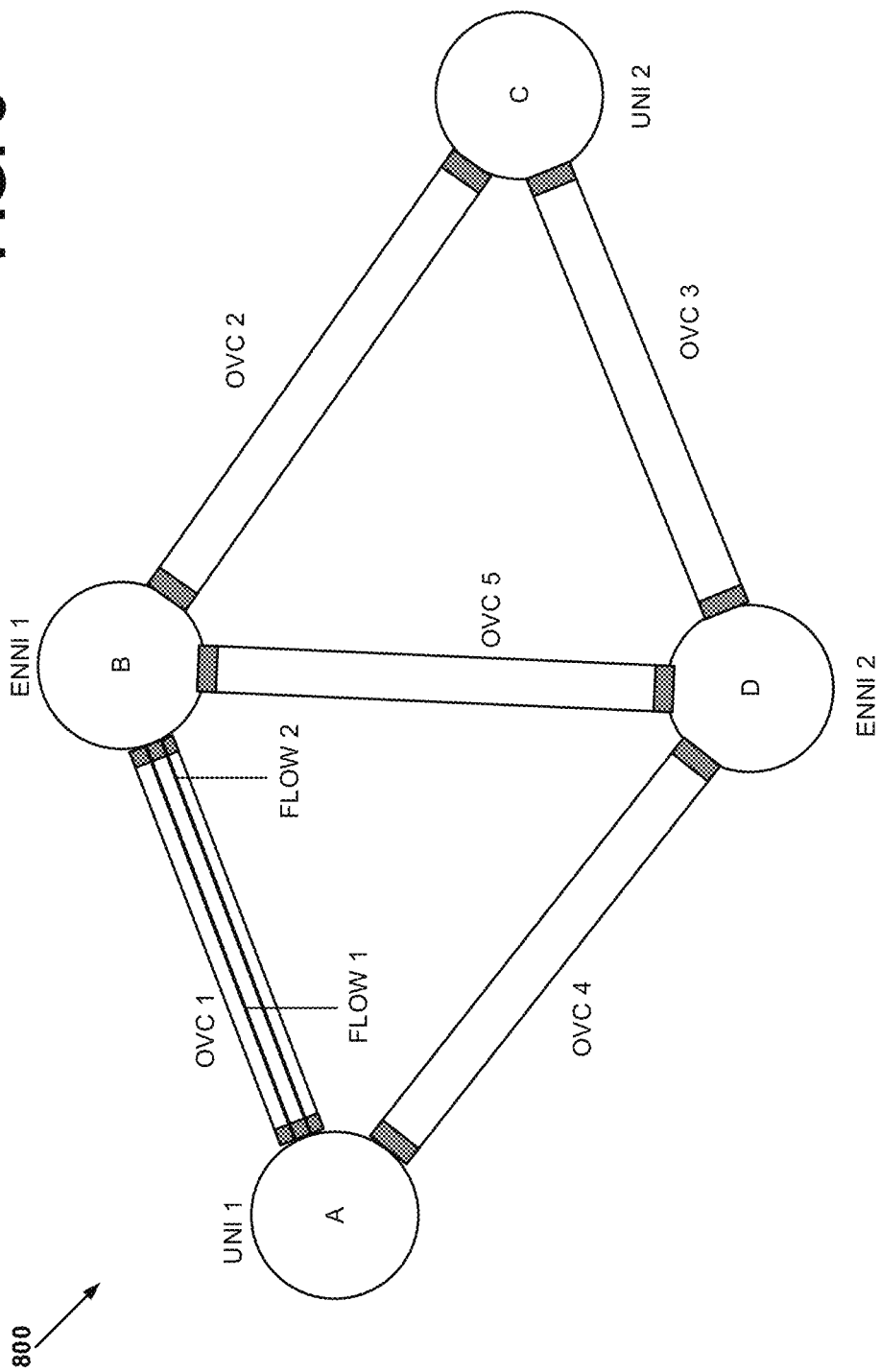
Figure 9:
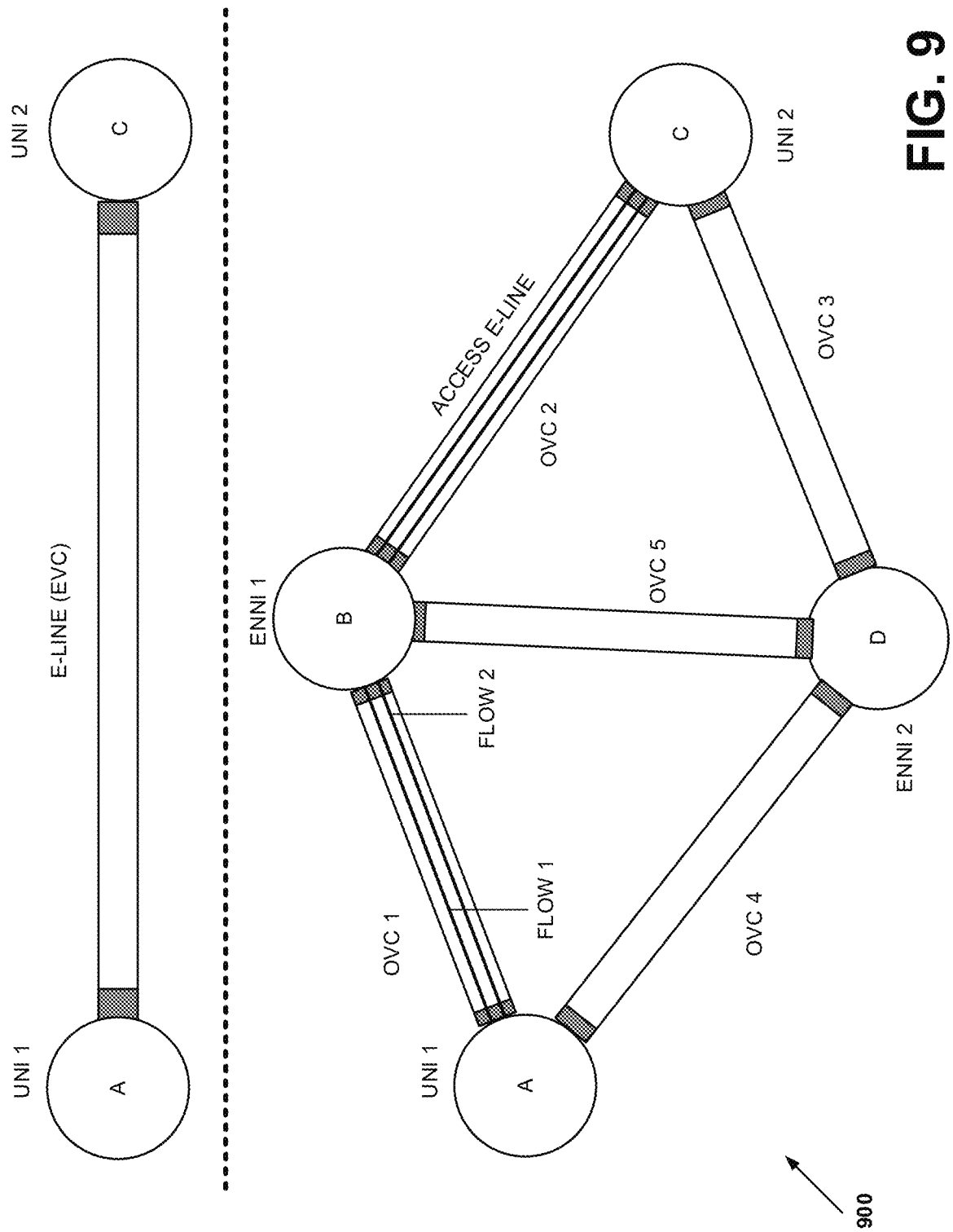

FIG. 8 shows a service topology 800 for access E-Line services between UNI and ENNI vertices (or interfaces). For example, UNI 1, ENNI 1 and OVC 1 form an Access E-Line service between UNI location and ENNI location. Flows 1 and 2 may be present in OVC 1. FIG. 9 further illustrates the access E-Line service topology 900. In contrast to FIG. 8, FIG. 9 shows an E-Line service comprising an EVC that includes OVC 1 and OVC 2 and extends from UNI 1 to UNI 2. Also, in FIG. 9, each of OVC 1 and OVC 2 may include two flows.

Figure 10:
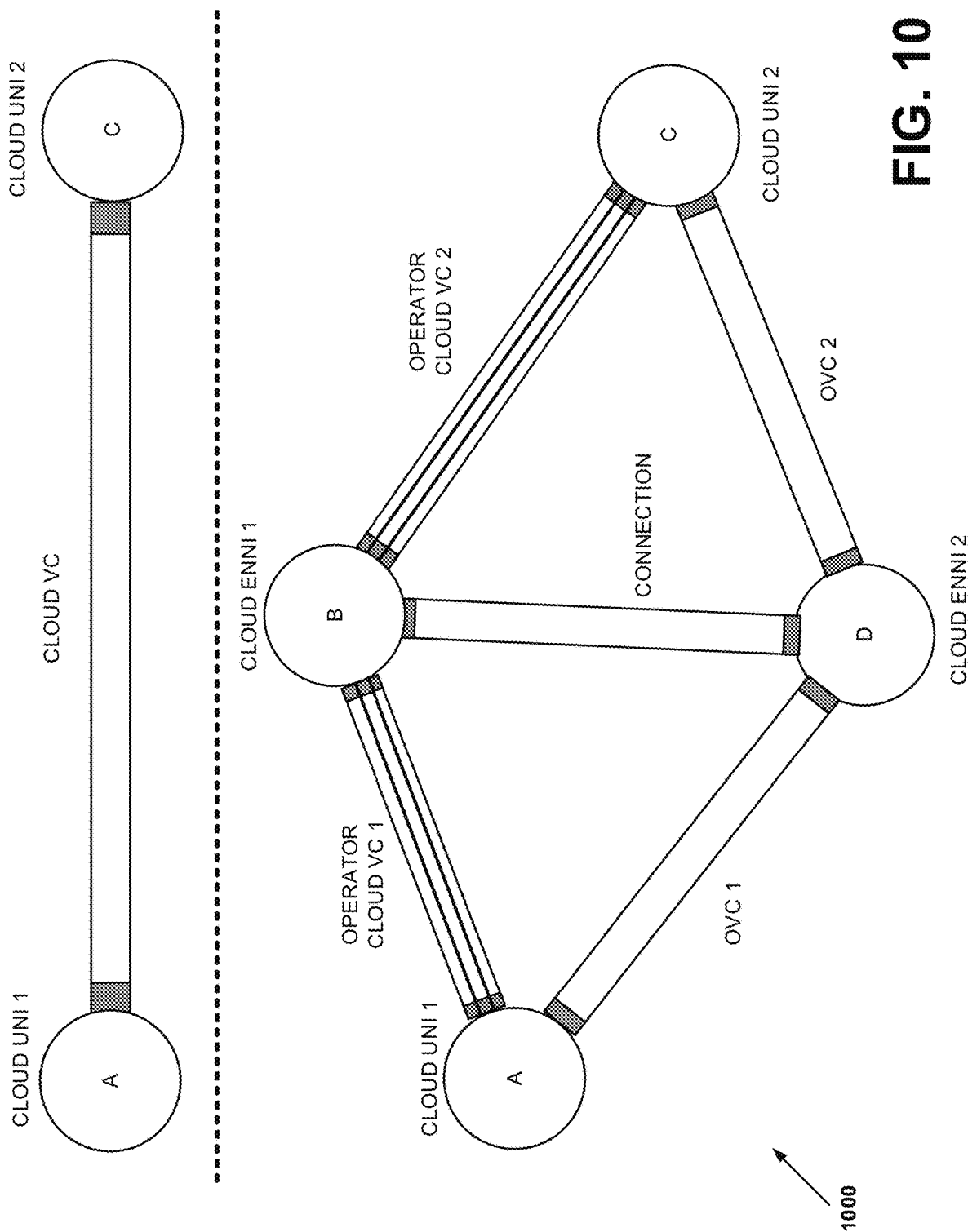

FIG. 10 depicts a cloud service topology 1000, according to an implementation. As shown, the nodes of service topology 1000 may include cloud UNIs 1 and 2, cloud ENNIs 1 and 2. The edges may include: an operator cloud VC 1 between cloud UNI 1 and the cloud ENNI 1; an operator cloud VC 2 between the cloud ENNI 1 and cloud UNI 2; an operator cloud VC 3 between cloud UNI 1 and the cloud ENNI 2; an operator cloud VC 2 between cloud UNI 2 and the cloud ENNI 2. As also shown, a cloud VC may be provided between cloud UNI 1 and cloud UNI 2, over operator cloud VC 1 and operator cloud VC 2.

Figure 11:
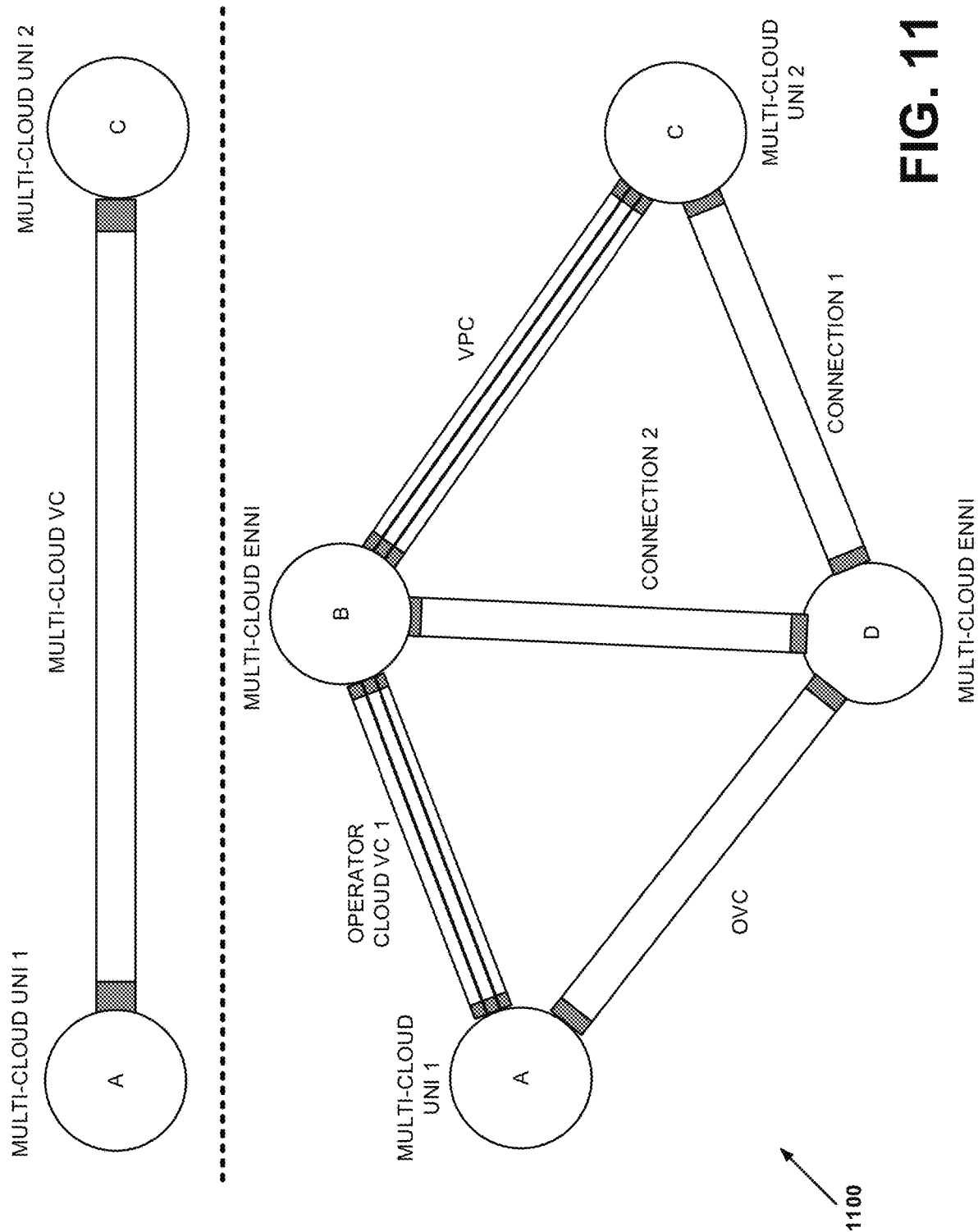

FIG. 11 depicts a multi-cloud service topology 1100, according to an implementation. As shown, the nodes of a multi-cloud service topology 1100 may include multi-cloud UNIs 1 and 2, a multi-cloud ENNIs 1 and 2. The edges may include: an operator cloud VC 1 between multi-cloud UNI 1 and the multi-cloud ENNI 1; an operator cloud VC supported by a virtual private cloud (VPC) of a cloud operator between the multi-cloud ENNI 1 and a multi-cloud UNI 2; an operator cloud VC3 between multi-cloud UNI 1 and the multi-cloud ENNI 2; an operator cloud VC4 between multi-cloud UNI 2 and the multi-cloud ENNI 2; and EPs at cloud UNIs and ENNIs.

Figure 12:
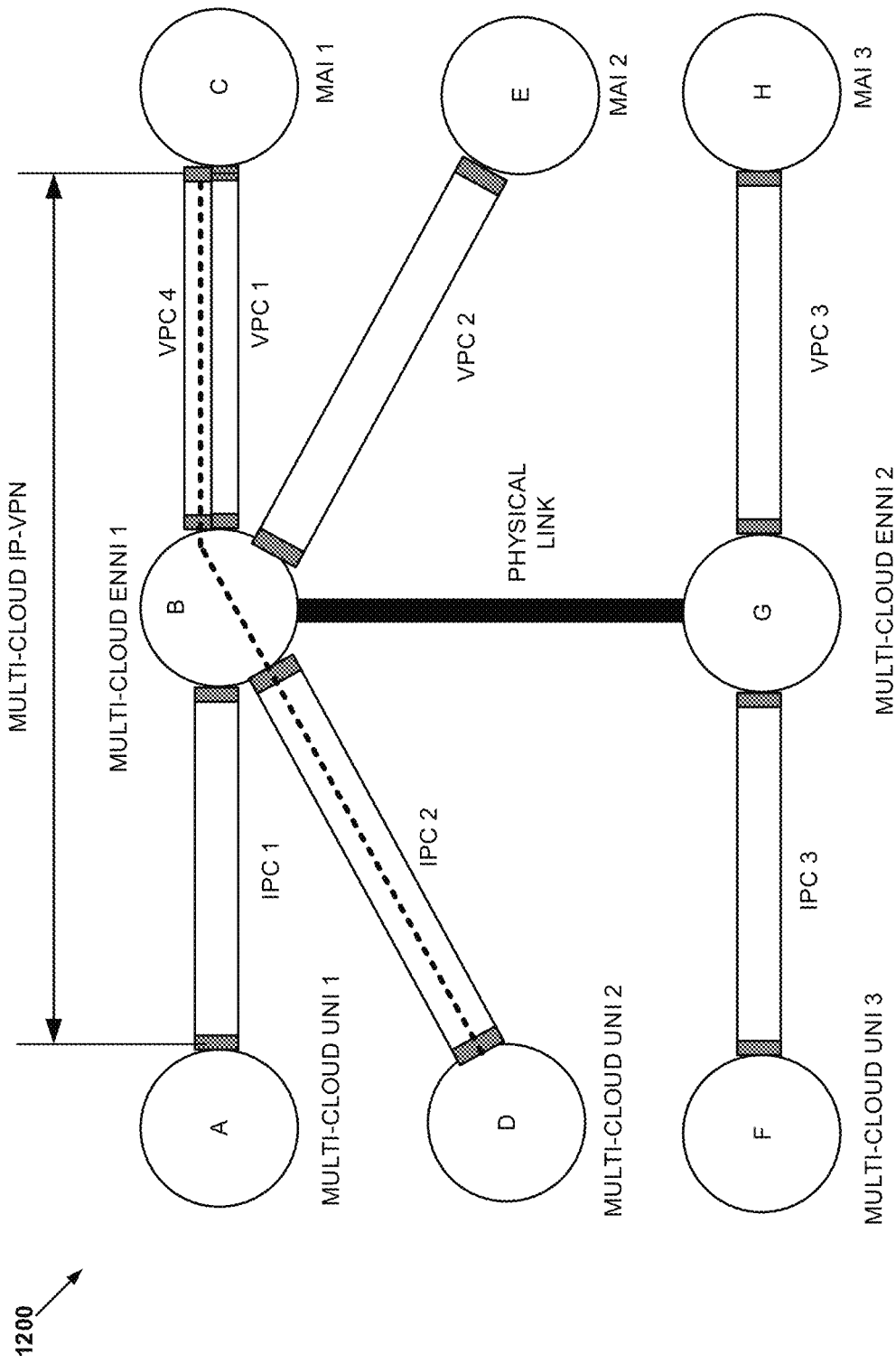

FIG. 12 depicts a multi-cloud service topology 1200 supported by one connectivity operator and two cloud operators, according to an implementation. As shown, cloud ENNI 1 may be between the connectivity operator and cloud operator 1, cloud ENNI 2 may be between the connectivity operator and cloud operator 2, and the two ENNIs may be connected via a physical link. As shown, the nodes of multi-cloud service topology 1200 may include multi-cloud UNIs 1, 2, and 3 supported by connectivity operator, multi-cloud application interfaces (MAIs) 1 and 2 supported by cloud operator 1, and MAI3 supported by cloud operator 2, and multi-cloud ENNIs 1 and 2. The edges may include: an IP connection (IPC) 1 between multi-cloud UNI 1 and the multi-cloud ENNI 1; a VPC 1 between multi-cloud ENNI 1 and MAI 1; a VPC 2 between multi-cloud ENNI 1 and MAI 2; a VPC 3 between multi-cloud ENNI 2 and MAI 3; an IPC 2 between multi-cloud UNI 2 and multi-cloud ENNI 1; an IPC 3 between multi-cloud UNI 3 and multi-cloud ENNI 2 which is supported by VPC 3 of cloud operator 2; and a physical link between multi-cloud ENNI 1 and multi-cloud ENNI 2. Nodes A, B, C, D, E, F, G, and H may form a virtual network (a multi-cloud VPN); and endpoint nodes D, B, and E may form another virtual network (see the dotted line). As further shown, part of the multi-cloud VPN may extend from multi-cloud UNI 1 to MAI 1. Application at node C may provide a service to both node A and node D (e.g., via the IP connection (IPC) and VPC 1 to node A, and via VPC 4 and connection 1 to node D).

Each of the multi-cloud applications in FIG. 11 and FIG. 12 may include a simple software application, a virtual network function (VNF), a cloud-native network function (CNF), a virtual machine (VM), or a container. If the application is hosted on a VM or a container, the MAI can include parameters that characterize or are associated with a central processing unit (CPU), a memory, and/or virtual connection termination parameters that pertain to the application, the VM, and/or the container.

Figure 13:
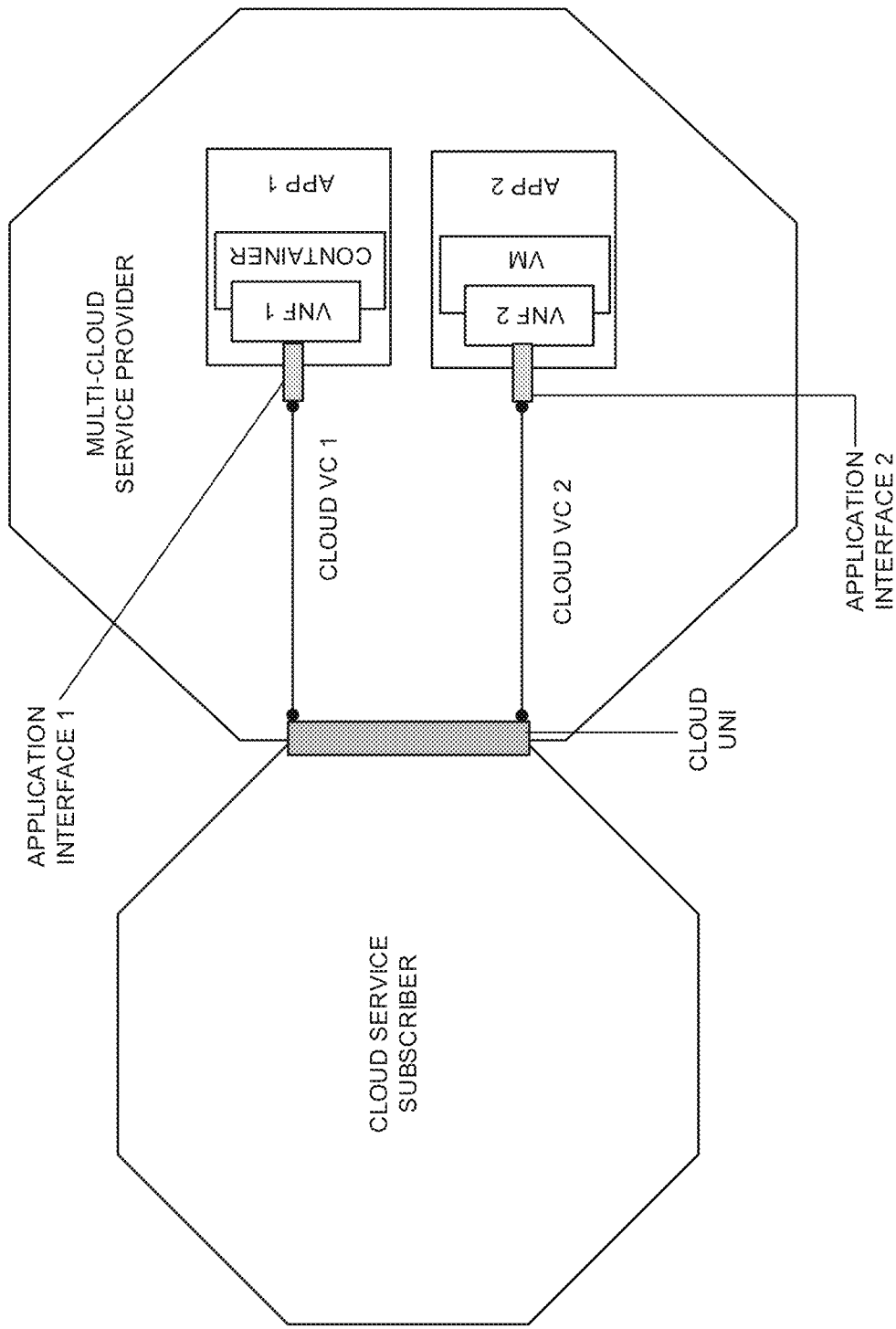
FIG. 13 illustrates a cloud service with applications comprising virtualized network functions (VNFs)

FIG. 13 illustrates a virtualized network function (VNF) service as an application service. As used herein in the context of cloud services, the term "application" may refer not only to VNFs, CNFs, regular software applications, but also other virtualized cloud infrastructure components such as VMs and containers. As shown, a multi-cloud service provider may provide the application service (i.e., the VNF service) to a cloud service subscriber through cloud UNI. Thus, application 1 ("app 1") includes a VNF 1 and its container 1 and application 2 includes VNF 2 implemented as a VM. A cloud VC 1 may extend from an application interface 1 for VNF 1 (or app 1) to the cloud UNI; and a cloud VC 2 may extend from an application interface 2 for VNF 2 (or app 2) to the cloud UNI. That is, a subscriber device may access VNF 1 over cloud VC 1 or VNF 2 over cloud VC 2.

Figure 14:
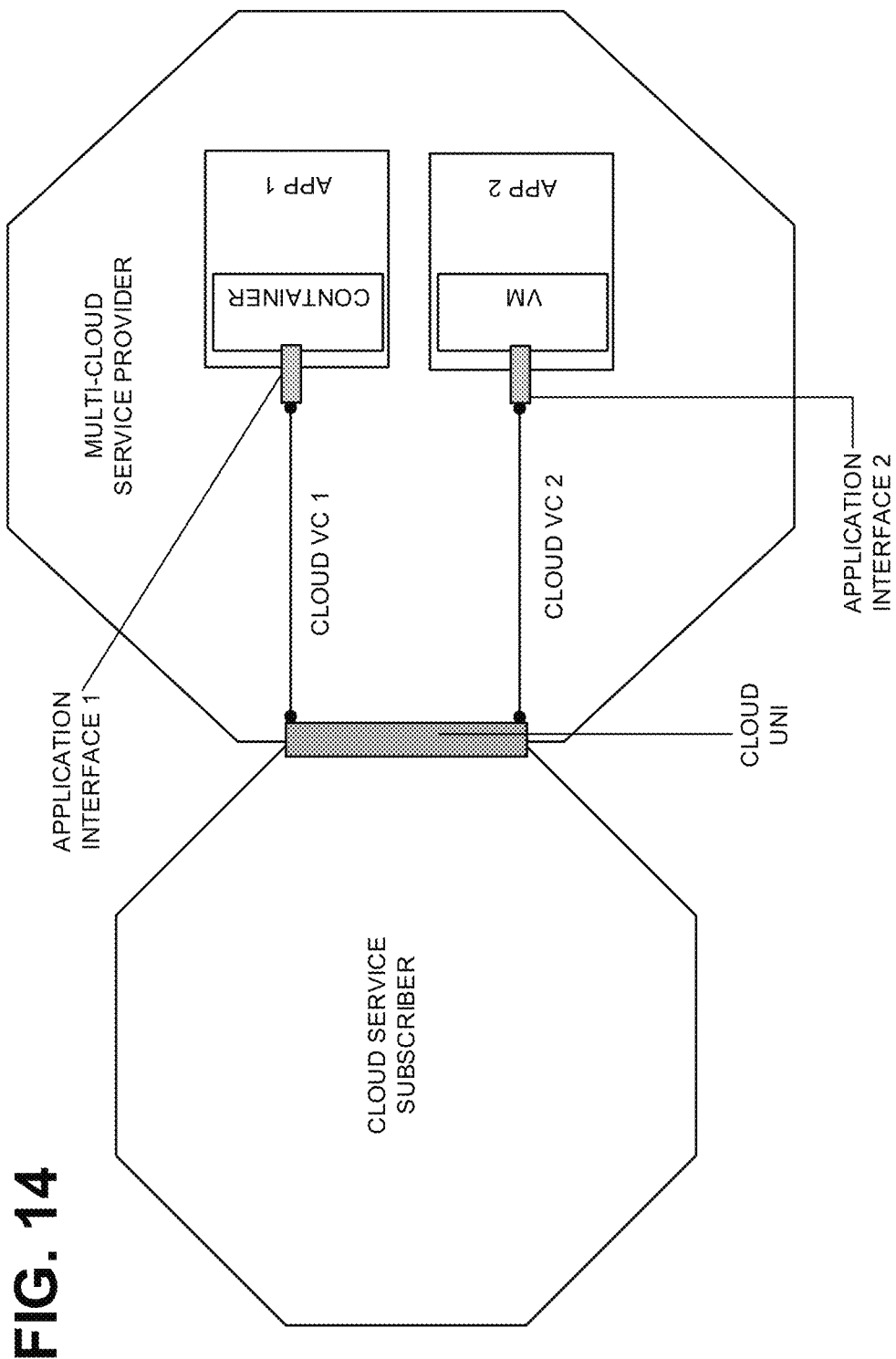
FIG. 14 illustrates a cloud service with applications comprising a virtual machine (VM) service and a container.

FIG. 14 illustrates a VM service and a container service as an application service. As shown, a multi-cloud service provider may provide the container service as application 1 service and the VM service as application 2 service to a cloud service subscriber through cloud UNI. That is, the cloud service provider may run the container as an application 1 and a VM as an application 2. A cloud VC 1 may extend from an application interface 1 for application 1 to the cloud UNI; and a cloud VC 2 may extend from an application interface 2 for application 2 to the cloud UNI. Accordingly, a subscriber device may access the container of the VM over cloud VC 1 or the VM over cloud VC 2.

Figure 15:
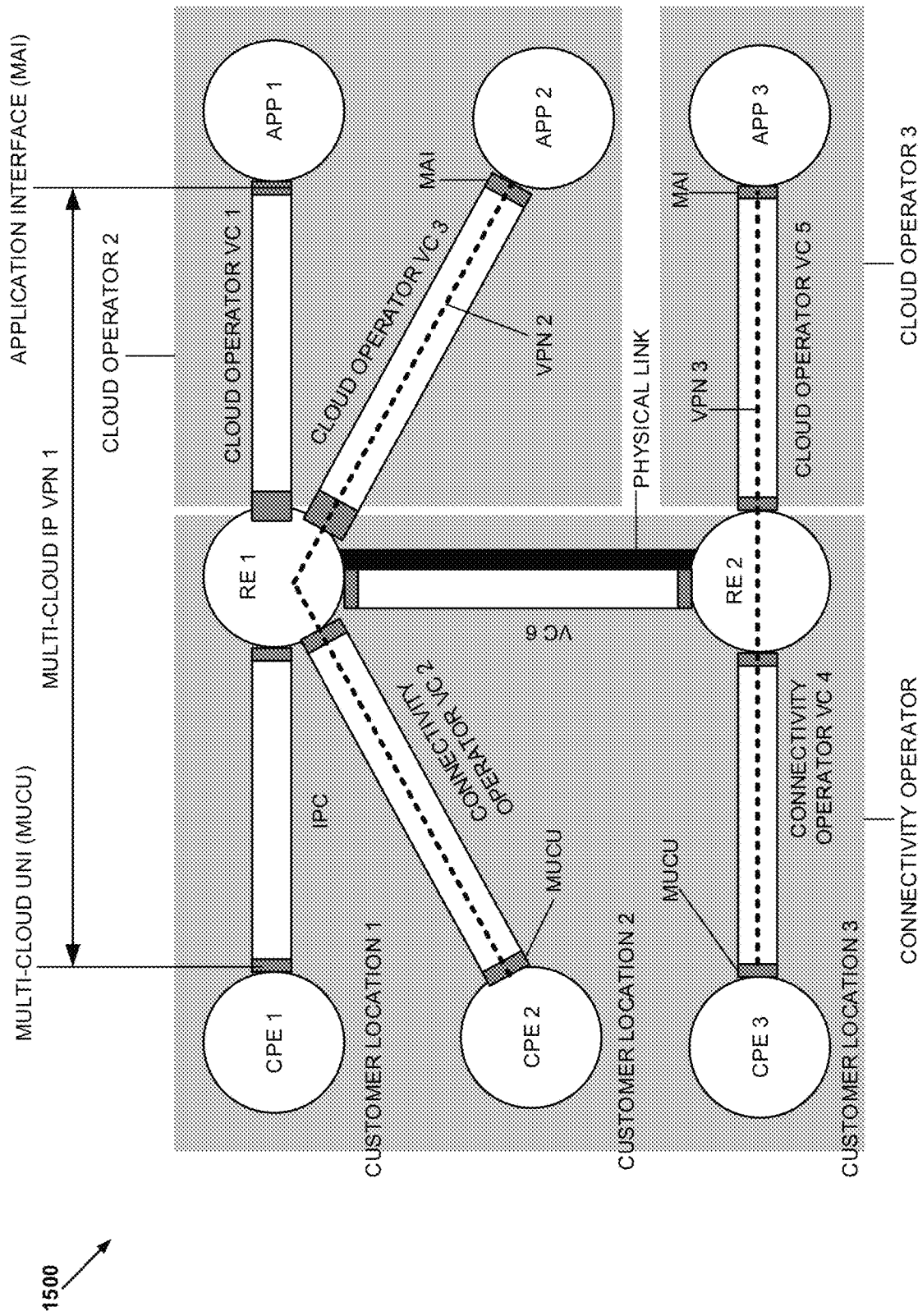
FIG. 15 depicts the topology of an example cloud service supported by two cloud operators and one connectivity operator where regional edge (RE) devices act as cloud External Network-to-Network Interfaces (ENNIs) between the connectivity operator and cloud operators, according to an implementation.

FIG. 15 depicts an example service topology 1500 for a multi-cloud service delivered to three customer locations with CPE 1, 2, and 3. The service is supported by a connectivity operator, cloud operators 1 and 2, and three applications supported by cloud operator 1 and 2, and connections from customer locations to applications. Topology 1500 may include a multi-cloud service topology. As shown, the nodes of multi-cloud service topology 1500 may include: multi-cloud UNIs 1, 2, and 3 at customer locations 1, 2, and 3 respectively; application interfaces 1, 2, and 3; and Regional Edge (RE) devices 1 and 2 supporting multi-cloud ENNIs 1 and 2. The edges of multi-cloud service topology 1500 may include: an IP connection (IPC) between CPE 1 and RE 1; a cloud operator virtual connection (VC) 1 between RE 1 and APP 1; a connectivity operator VC 2 between CPE 2 and RE 1; a cloud operator VC 3 between RE 1 and APP 2; a connectivity operator VC 4 between CPE 3 and RE 2; a cloud operator VC 5 between RE 2 and APP 3; and a VC 6 over a physical link between RE 1 and RE 2. The multi-cloud service of FIG. 15 may include multiple VPNs (i.e., multi-cloud VCs). For example, a multi-cloud IP VPN 1 may extend from a multi-cloud UNI at CPE 1 to an application interface at APP 1. In other examples, a VPN 2 may be established between CPE 2 and application 2; and VPN 3 may be established between CPE 3 and application 3.

Figure 16:
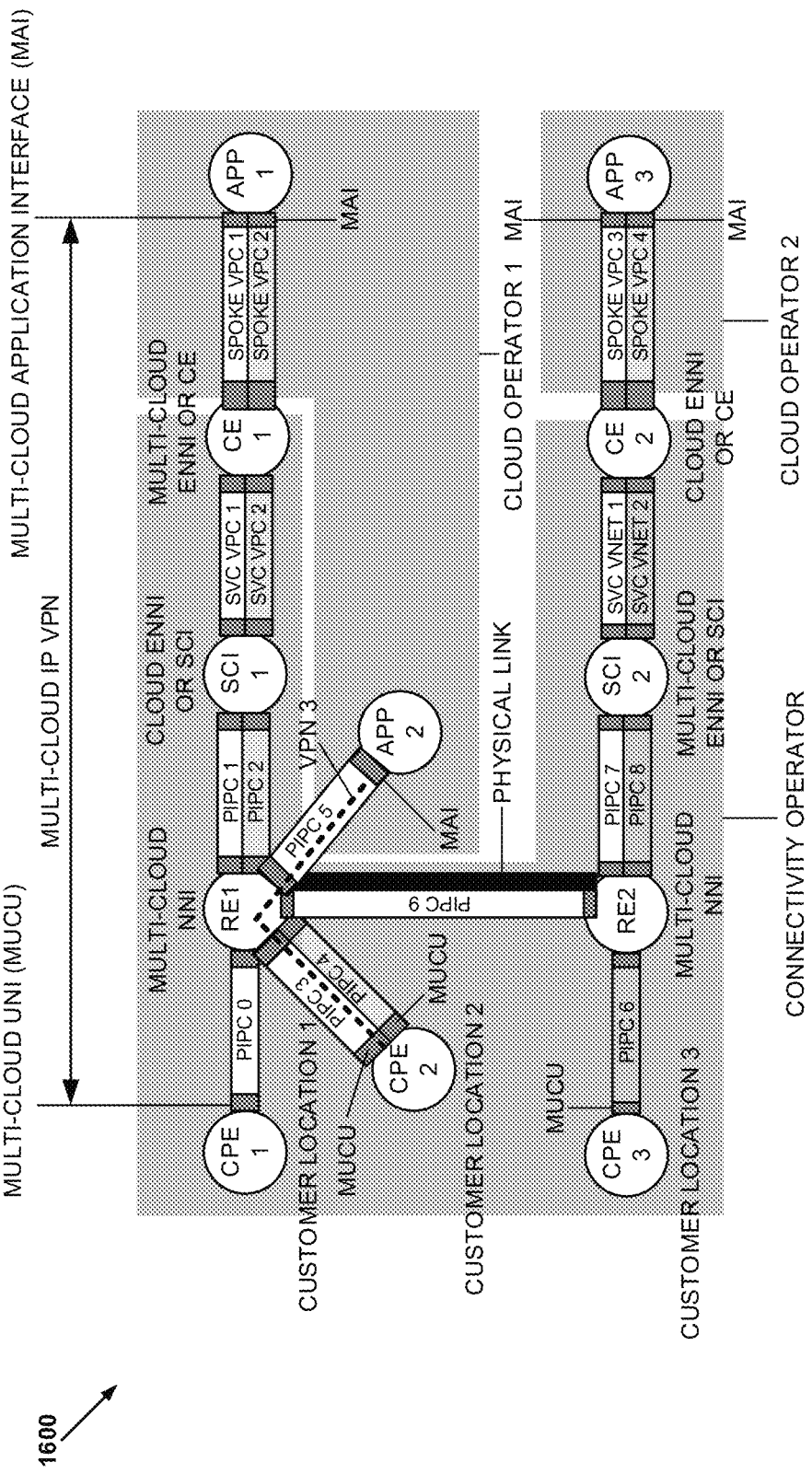
FIG. 16 depicts the topology of another example cloud service supported by two cloud operators and one connectivity operator where customer edge (CE) devices act as cloud ENNIs between the connectivity operator and cloud operators, according to an implementation.

FIG. 16 depicts an example service topology 1600 for a multi-cloud service delivered to three customer locations with CPE 1, 2, and 3. The service is supported by a connectivity operator, cloud operators 1 and 2, and three applications supported by cloud operator 1 and 2, and connections from customer locations to applications, according to an implementation. This implementation is the same as that in FIG. 15. FIG. 16 depicts multi-cloud NNIs within operators in addition to multi-cloud ENNIs between operators. As shown, the nodes of multi-cloud service topology 1600 may include: multi-cloud UNIs 1, 2, and 3 at customer locations 1, 2, and 3 respectively; multi-cloud application interfaces 1, 2, and 3; Regional Edge (RE) devices 1 and 2 supporting multi-cloud NNIs for connectivity operator; Secure Cloud Interconnect (SCI) nodes 1 and 2 supporting multi-cloud NNIs for connectivity operator; and customer edges (CEs) 1 and 2 supporting multi-cloud ENNIs 1 and 2 between connectivity operator and cloud operators 1 and 2. The edges in topology 1600 may include: a private IP connection (PIPC 0) between CPE 1 and RE 1; PIPCs 1 and 2 between RE 1 and SCI 1; service VPCs 1 and 2 between SCI 1 and CE 1; spoke VPCs 1 and 2 between CE 1 and APP 1; PIPCs 3 and 4 between CPE 2 and RE 1; PIPC 5 between RE 1 and APP 2; PIPC 6 between CPE 3 and RE 2; PIPCs 7 and 8 between RE 2 and SCI 2; service Virtual nets (VNETs) 1 and 2 between SCI 2 and CE 2; spoke VNETs 3 and 4 between CE 2 and APP 3; and a PIPC 9 over a physical link between RE 1 and RE 2.

A multi-cloud IP VPN may extend from a multi-cloud UNI at CPE 1 to an application interface at application 1. As also shown, a VPN 1 may be established between CPE 2 and application 1 over PIPC 4, PIPC 2, service VPC 2, and spoke VPC 2, which are shaded. A VPN 2 may be established between CPE 3 and application 3 over PIPC 6, PIPC 8, service virtual net 2 (VNET 2) and spoke VNET 4 (also shaded). A VPN 3 (multi-cloud VC) is also established between CPE 2 and application 2 via PIPC 3 and PIPC 5. As also shown, cloud operator 1, cloud operator 2, and connectivity-operator as associated with different portions of service topology 1600.

As indicated above, SHC unit 118 may obtain service topologies from topology builder 116 and use the obtained topologies to determine health metrics for the corresponding services. For example, SHC unit 118 may determine a health parameter for a service as a single number based on a service topology. The value of the health parameter may convey a sense of the health of the service to an interested party and trigger possible remedial actions. For example, denoting the value of a health parameter by H, the value of H equal to 1 may indicate that there is no degradation and there is no SLA violation. In contrast, the value of H equal to 0 may indicate there is a complete failure of the service. For service degradation, the value of H may depend on the level of degradation that can be set by the service user or service administrator. For example, the value of H for a cloud VC could be set to 0.5 when its one-way delay twice of its contractual value (i.e. health threshold 7) between user and cloud service provider while the value of H for a cloud VC could be 0.9 when its one-way delay is. 90% of its contractual value (i.e., health threshold T). SHC unit 118 may receive service performance measurements such as packet loss, delay and jitter, and performance threshold crossing alerts (TCAs) from performance management system 112, and service component status events and failure alarms from fault management system 114; and determines corresponding H value for each TCA, event and alarm issues for a given service component based its pre-set values in its databases. The performance and fault management systems may take appropriate action, such as initiating a repair, alerting network administrators, etc. If $H_O$, $L_i$, and N denote the overall health of a service, the health of service location, and the number of locations, respectively, then, application 118 may compute $H_O$ in accordance with the following expression:

$$H_O = \sum L_i/N, \quad (1)$$

In expression (1), $L_i$ may be summed over I from 1 to N. Omitting i from $L_i$ notation (i is implicitly present), the health L of location i may be written as:

$$L = (H_t \cdot W_t)(H_{cs} \cdot W_{cs})(H_A \cdot W_A)(H_{AS} \cdot W_{AS}). \quad (2)$$

In expression (2), $H_t$, $W_t$, $H_{cs}$, $W_{cs}$, $H_A$, $W_A$, $H_{AS}$, and $W_{AS}$ may denote the following: a connectivity transport health; a connectivity transport weight; a connectivity transport security health; a connectivity transport security weight; an application process (i.e., all application components except security) health; application process health weight; an application security health; and an application security health weight. The weights $W_t$, $W_{cs}$, $W_A$, and $W_{AS}$ may indicate the importance or significant of the health parameters $H_t$, $H_{cs}$, $H_A$ and $H_{AS}$, respectively. $W_t$, $W_{cs}$, $W_A$, and $W_{AS}$ may be configurable and their default value may be set to 1.

SHC unit 118 may apply expressions similar to (1) and (2) to compute the health of different services. For example, SHC unit 118 may determine the health of an access E-Line service, whose topology is shown in FIG. 9. With $H_{A\text{-}E\text{-}Line}$, $H_{UNI}$, $H_{ENNI}$, $H_{OVC}$, $W_{UNI}$, $W_{ENNI}$, and $W_{OVC}$ denoting, respectively, the overall health of an access E-Line, the health of a carrier Ethernet UNI, the health of a carrier Ethernet ENNI, the health of the OVC from the carrier Ethernet UNI to the carrier Ethernet ENNI, the weight for $H_{UNI}$, the weight for $H_{ENNI}$, and the weight for $H_{OVC}$, SHC unit 118 may evaluate:

$$H_{A-E-Line} = H_{UNI} \cdot W_{UNI} \cdot H_{ENNI} \cdot W_{ENNI} \cdot H_{OVC} \cdot W_{OVC} \quad (3)$$

Expression (3) may not account for security. When accounting for security, SHC unit 118 may evaluate:

$$H_{A-E-Line-S} = H_{E-Line} \cdot H_{A-SECURITY} \quad (4)$$

$H_{A\text{-}SECURITY}$ may be given by:

$$H_{A-SECURITY} = H_{UNI-S} \cdot W_{UNI-S} \cdot H_{ENNI-S} \cdot W_{ENNI-S} \cdot H_{OVS-S} \cdot W_{OVS-S} \quad (5)$$

$H_{UNI\text{-}S}$, $W_{UNI\text{-}S}$, $H_{ENNI\text{-}S}$, $W_{ENNI\text{-}S}$, $H_{OVC\text{-}S}$, and Words may represent security health of the carrier Ethernet UNI, the carrier Ethernet ENNI, the OVC, and the corresponding weights. In expressions (3)-(5), it may be assumed that the health of the carrier Ethernet UNI and the health of the carrier Ethernet ENNI include the health of the OVC EPs.

For services that include multiple locations, SHC unit 118 may apply expression (1) with $H_{A\text{-}E\text{-}Line}$ or $H_{A\text{-}E\text{-}Line\text{-}S}$ replacing L, to obtain the health of multi-location access E-Line services without or with security:

$$H_O = \sum H_{A-E-Line}/N, \text{ and} \quad (6)$$

$$H_O = \sum H_{A-E-Line-S}/N \quad (7)$$

Although $H_{A-E-Line}$ and $H_{A-E-Line-S}$ in expressions (6) and (7) may be dependent on index i, for clarity, the index i is not explicitly shown. The summations in expressions (6) and (7) may be performed over i=1 to i=N. Given that the OVC between the ENNI and the UNI is shared by the UNI and the ENNI, health of OVC is counted twice in expressions (6) and (7).

In another implementation, SHC unit 118 may determine the health of an E-Line service, whose topology may be also shown in FIG. 9. With $H_{E-Line}$, $H_{UNI1}$, $H_{UNI2}$, $H_{EVC}$, $W_{UNI1}$, $W_{UNI2}$, and $W_{EVC}$ denoting the overall health of an E-Line, the health of the carrier Ethernet UNI1, the health of the carrier Ethernet UNI2, the health of the EVC, and their corresponding weights, SHC unit 118 may evaluate (not accounting for security):

$$H_{E-Line} = H_{UNI1} \cdot W_{UNI1} \cdot H_{UNI2} \cdot W_{UNI2} \cdot H_{EVC} \cdot W_{EVC}. \quad (8)$$

Expression (8) may not account for security. Accounting for security, SHC unit 118 may evaluate:

$$H_{E-Line-S} = H_{E-Line} \cdot H_{SECURITY} \quad (9)$$

$H_{SECURITY}$ is given by:

$$H_{SECURITY} = H_{UNI1-S} \cdot W_{UNI1-S} \cdot H_{UNI2-S} \cdot W_{UNI2-S} \cdot H_{EVC-S} \cdot W_{EVC-S} \quad (10)$$

$H_{UNI1-S}$, $H_{UNI2-S}$, $H_{EVC-S}$, $W_{EVC-S}$, $W_{UNI1-S}$, $W_{UNI2-S}$, and $W_{EVC-S}$ may represent security health of the Carrier Ethernet UNI 1, the carrier Ethernet UNI 2, the EVC and the corresponding weights. In expressions (10)-(11), it may be assumed that the health of the carrier Ethernet UNI 1 and the carrier Ethernet UNI 2 includes the health of the EVC EPs.

For services that include multiple locations, SHC unit 118 may apply expression (1) with $H_{E-Line}$ or $H_{E-Line-S}$ replacing L, to obtain the health of multi-location E-Line services without or with security:

$$H_O = \sum H_{E-Line}/N, \text{ and} \quad (11)$$

$$H_O = \sum H_{E-Line-s}/N \quad (12)$$

Although $H_{E-Line}$ and $H_{E-Line-S}$ in expressions (11) and (12) may depend on index i, the index i is not explicitly shown. In addition, the summations of expressions (11) and (12) may be performed over i=1 to i=N. The EVC between two UNIs in an E-Line service is shared by both UNI locations. Therefore, health of EVC is counted twice in expressions (11) and (12).

In yet another implementation, SHC unit 118 may obtain an overall service health for Ethernet Local Area Network (E-LAN) services. To determine the overall E-LAN health, SHC unit 118 may compute the following expression:

$$H_{E-LAN} = \left[\sum H_{CE-UNIi} \cdot W_{CE-UNIi}\right] H_{EVC} \cdot W_{EVC}. \quad (13)$$

In expression (13), $H_{E-LAN}$, $H_{CE-UNI}$, $W_{CE-UNI}$, $H_{EVC}$, $W_{EVC}$ may represent the following: overall E-LAN health; the health of the carrier Ethernet UNIs; the weight associated with the carrier Ethernet UNIs; overall health of the EVC; and a weight associated with the EVC. $H_{CE-UNI}$ and $W_{CE-UNIi}$ may depend on index i, even when the index i is not explicitly shown in expression (13). In addition, the summation of expression (13) may be performed over i=1 to i=M assuming E-LAN is among M locations. In expression (13), it may be assumed that the health of the Carrier Ethernet UNI includes the health of the EVC EP. In some implementations, all $W_{CE-UNI}$ for different values of i may be substituted with a single value, assuming the same weight for all the UNIs in the particular E-LAN. In a more general case, each of the $W_{CE-UNI}$ for different i may be different. Accounting for security, SHC unit 118 may compute the overall E-LAN health by evaluating:

$$H_{E-LAN-S} = \left[\sum H_{CE-UNIi-S} \cdot W_{CE-UNIi-S}\right] \cdot H_{EVC-S} \cdot W_{EVC-S}. \quad (14)$$

In expression (14), $H_{E-LAN-S}$, $H_{CE-UNIi-S}$, $W_{CE-UNTi-S}$, $H_{EVC-S}$, and $W_{EVC-S}$, may represent the following: the overall health of E-LAN accounting for security health; the security health of cattier Ethernet UNIs; the weights associated with the security health of the carrier Ethernet UNIs; the security health of the EVC; and a weight associated with the security health of the EVC. $H_{CE-UNIi-S}$ and $W_{CE-UNIi-S}$ may depend on index i. In addition, the summation of expression (14) may be performed over i=1 to i=M. In expression (14), it may be assumed that the health of the carrier Ethernet UNI includes the health of the EVC EP. In some implementations, all $W_{CE-UNI-S}$ for different values of i may be substituted with a single value, assuming the same weight for all security health of the UNIs in the particular E-LAN. In a more general case, each of the $W_{CE-UNI-S}$ for different i may be different.

From expression (13) and (14), $H_O$ for E-LAN can be calculated as $$H_O = H_{E-LAN} \cdot H_{E-LAN-S}. \quad (15)$$

In some implementations, SHC unit 118 may obtain an overall service health for cloud services based on a service topology similar to the one depicted in FIG. 10. To determine the cloud service health, SHC unit 118 may evaluate expressions that are similar to expression (1):

$$H_C = \sum C/K. \quad (16)$$

In expression (16), C may denote the health of cloud service at a particular location i, and may be summed over i from 1 to K. The health C of a particular cloud at location i may be written as:

$$C = (C_t \cdot W_{ct})(H_{cs} \cdot W_{cs})(H_A \cdot W_A)(H_{AS} \cdot W_{AS}). \quad (17)$$

In expression (17), $C_t$, $W_{ct}$, $H_{cs}$, $W_{cs}$, $H_A$, $W_A$, $H_{AS}$, $W_{AS}$ may denote the following: a connectivity transport health, a connectivity transport weight, a connectivity transport security health, a connectivity transport security weight, an application process (i.e., all application components except security) health, an application process health weight, an application security health, and an application security health weight. The weights $W_{ct}$, $W_{cs}$, and $W_{AS}$ may indicate the importance or significant of the health parameters $C_t$, $H_{cs}$, and $H_{AS}$. $W_{ct}$, $W_{cs}$, $W_A$, and $W_{AS}$ may be configurable and their default value may be set to 1.

For the service topology associated with the multi-cloud IP VPN in FIG. 16, SHC unit may determine the transport connectivity health $H_C$ as:

$$H_C = (H_{CPE} \cdot H_{IPC} \cdot H_{RE} \cdot H_{VPC} \cdot H_{SCI} \cdot H_{SVPC} \cdot H_{CEC}) \cdot W_C. \quad (18)$$

In expression (18), $H_C$, $H_{CPE}$, $H_{IPC}$, $H_{RE}$, $H_{PIPC}$, $H_{SCI}$, $H_{SVPC}$, $H_{CEC}$, and $W_C$ may denote the connectivity transport health, the health of a CPE (shown as CPE 1), the health of an IPC (shown as PIPC 0 from CPE 1 to RE 1), the health of RE (shown as RE 1), the health of VPC (shown as PIPC 1), the health of SCI (shown as SCI 1), the health of VPC (shown as SVC VPC), the health of a CE cluster (shown as CE 1), and the weight for the connectivity health. Still referring to FIG. 16, the health of an application process may be evaluated as:

$$H_P = H_{SPOKE-VPC} \cdot H_{APP} \cdot W_{APP}. \quad (19)$$

In expression (19), $H_P$, $H_{SPOKE-VPC}$, $H_{APP}$, and $W_{APP}$ denote the health of application process, the health of a spoke VPC (shown as SPOKE VPC 1), the health of application (shown as APP 1), and the weight associated with APP 1. SHC unit 118 may account for security and evaluate an expression similar to (18) by including security health terms and security health weights for each of the nodes and edges, in a manner similar to the expressions for the E-Line and/or the E-LAN.

Figure 17A:
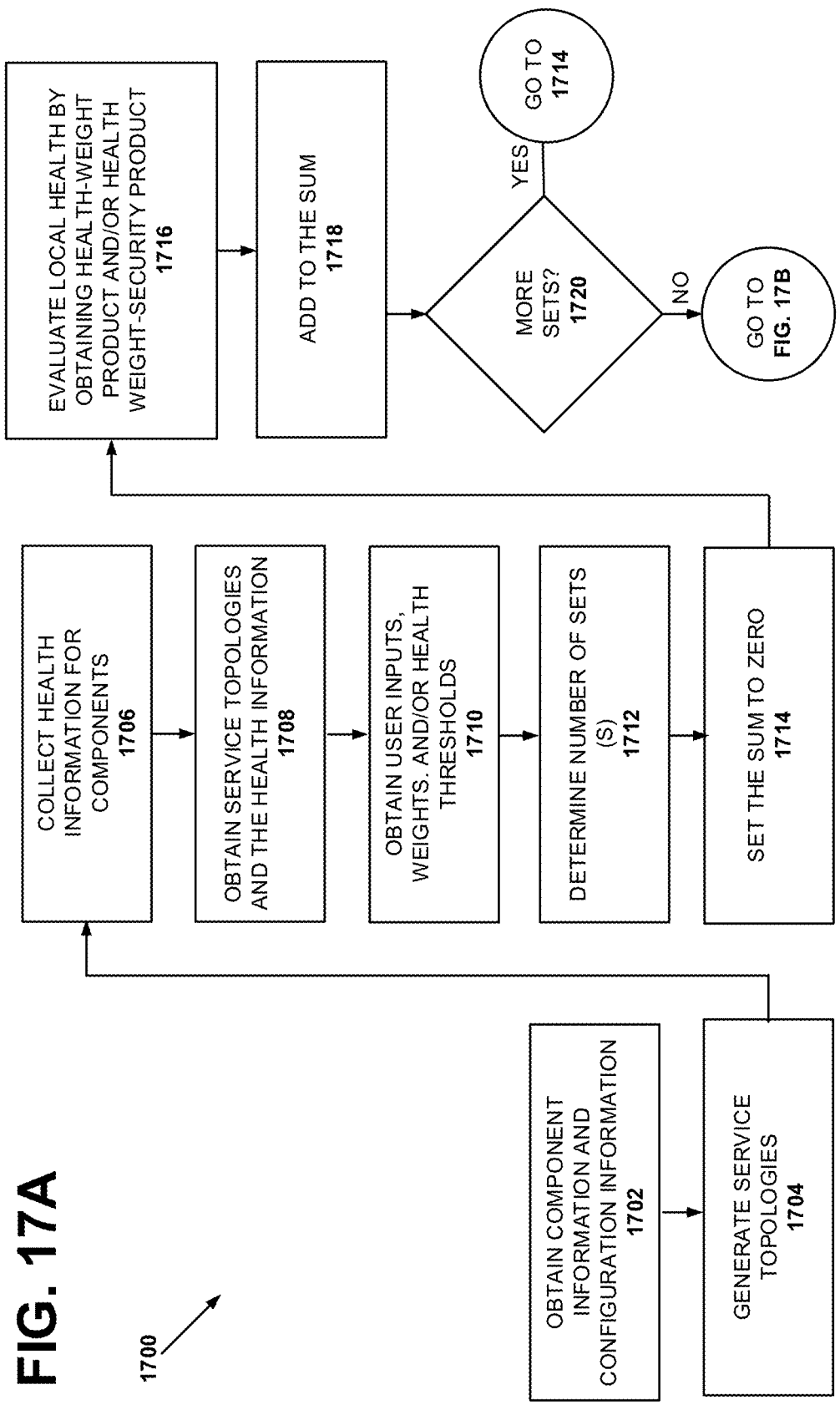
FIGS. 17A and 17B show a flow diagram of an example process for evaluating health of a service rendered in accordance with one or more service topologies, according to an implementation.
Figure 17B:
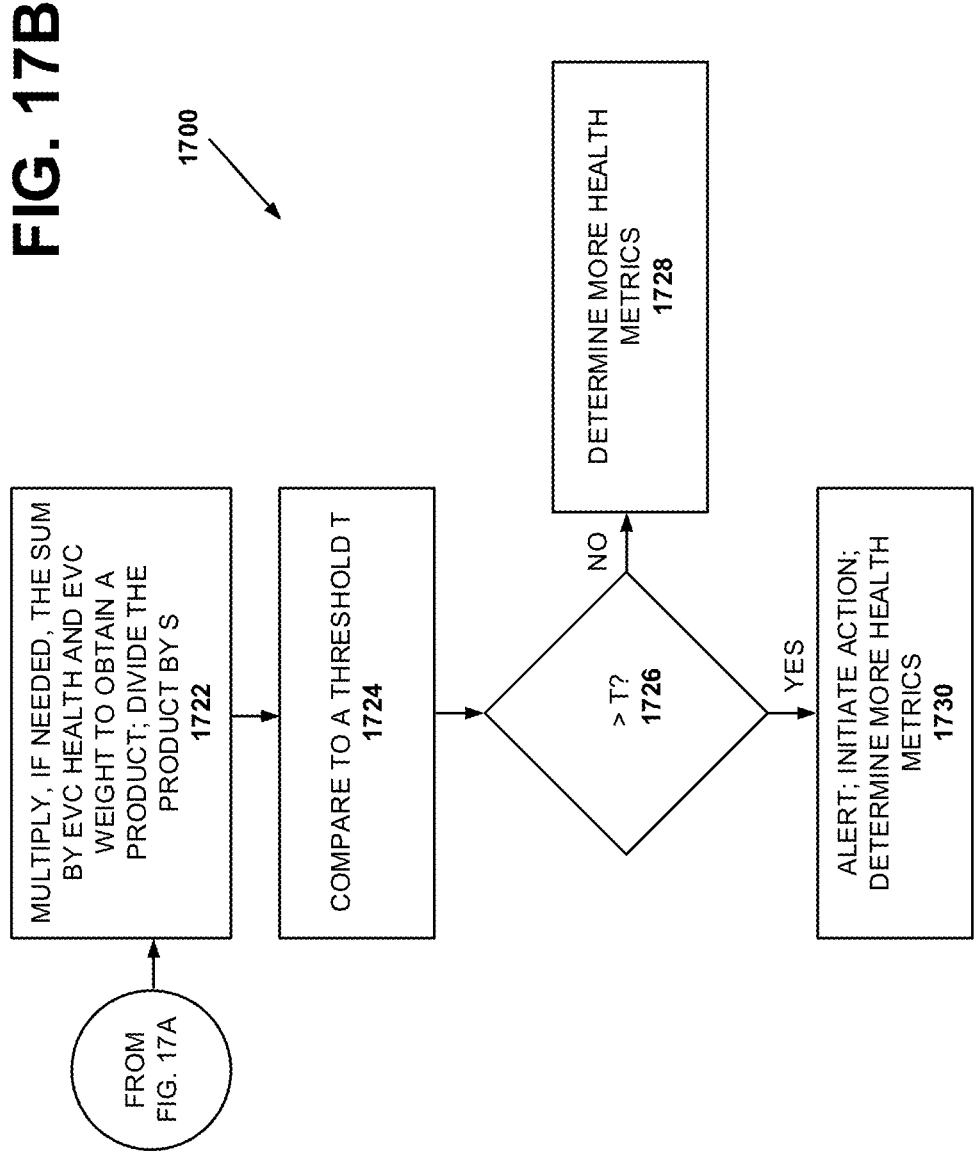

FIGS. 17A and 17B show a flow diagram 1700 of an example process for evaluating a health of a service. Process 1700 may be performed by user devices 102, monitoring system 106, inventory system 110, performance management system 112, fault management system 114, topology builder 116, and/or SHC unit 118. Referring to FIG. 17A, process 1700 may further include obtaining component information and their configuration information (block 1702). For example, topology builder 116 may obtain service component information and/or their configuration information from inventory system 110. The configuration information may include, for example, connectivity information between the service components, bandwidth information, physical characteristics, physical location information, a Transmission Control Protocol (TCP) number for the application, etc. The information may identify UNIs, ENNIs, REs, SCIs, OVCs, EVCs, cloud UNIs, cloud virtual connections, cloud ENNIs, operator virtual connections, or load balancers, one or more flows between the nodes, connections of the nodes and therefore the configuration of the graph, etc. After topology builder 116 obtains the network component information and the configuration information from inventory system 110, topology builder 116 may generate service topologies based on the information (block 1704).

Process 1700 may include collecting health information for network components (block 1706). For example, monitoring system 106 may collect telemetry information at various service components (e.g., a hardware component, a software component, a physical connection, a logical connection, a VM, a container, etc.). Monitoring system 106 may forward the collected telemetry information to performance management system 114, fault management system, and/or SHC unit 118, periodically, on demand, or in real time.

Process 1700 may further include obtaining user inputs, weights (e.g., the weights in expressions (1)-(19)), and/or health thresholds (block 1710). For example, SHC unit 118 may obtain user input for selecting a particular service topology for which SHC unit 118 is to determine values of the health metrics, such as a selection of one of an access E-Line service topology, a cloud service topology, or an E-LAN service topology, etc. SHC unit 118 may also obtain weights for computing the health metrics, from other service components (e.g., user devices 102). Performance management system 112 and fault management system 114 may obtain health thresholds, either from user device 102 or from other service components. Although FIG. 17A shows obtaining of the weights and/or health thresholds at block 1710, in other implementations, the user inputs, the weights and/or health thresholds may be obtained at other blocks whose actions occur prior to after those of block 1710.

Based on the obtained service topologies, weights, and/or other information, SHC unit 118 may compute the selected health metrics, periodically, in real time, or on demand from user devices, performance management system 112, fault management system 114, or other service components. To begin evaluating a health metric for a service topology, SHC unit 118 may determine a number of sets S (e.g., a number of nodes or a number of pairs of nodes) for which SHC unit 118 may determine individual health metrics (block 1712). For example, if the selected service topology includes an E-Line, the number of sets S is equal to the number of nodes N while the number of EVCs are N/2. If the selected service topology includes an E-LAN, the number of sets S is equal to the number of nodes N while the number of EVCs (i.e., segments of multipoint connection) is also N. Thus, the number of sets may depend on the selected service topology. In addition, SHC unit 118 may set its register or a variable (i.e., a memory locations) for summing (or accumulating) the health metrics to zero (block 1714). In some implementation, the sum may be periodically used to obtain an average (for a given time interval, such as an hour, a day, or a week, and then set to zero to restart the averaging.

Process 1700 may further include determining, for a given set (designated by the index i for expressions (1)-(19)), a health-weight product term (also simply called a health-weight term or a health-weight product) or a health-weight-security product term (also simply called a health-weight-security term or a health-weight-security product) in expressions (1)-(19) (block 1716). For example, if an access E-Line service topology was selected, SHC unit 118 may evaluate the health-weight term defined by expression (3) or health-weight-security term defined by expressions (4) and (5), depending on whether SHC unit 118 is to account for security health; if an E-Line service topology was selected, SHC unit 118 may evaluate the health-weight term defined by expression (8) or health-weight-security term defined by expressions (9) and (10), depending on whether SHC unit 118 is to account for security health; if an E-LAN service topology was selected, depending on whether security health is to be accounted for, SHC unit 118 may evaluate the health-weight term kernel of the expressions (13) or the health-weight-security term kernel of expression (15) (see expression (14)), where the kernel is the mathematical product term within the summation sign; if a cloud service topology like the one shown in FIG. 10 was selected, SHC unit 118 may evaluate the health-weight-security term defined by expressions (16) and (17); and if a multi-cloud IP VPN like the one shown in FIG. 16 was selected, SHC unit 118 may evaluate expressions (18) and (19). After evaluating either the health-weight product or the health-weight-security product, SHC unit 118 may add the evaluated product to the sum (block 1718).

Process 1700 may further include determining whether there is another set (e.g., a node, a location, or a pair of nodes) for which SHC unit 118 is to evaluate a health-weight product or a health-weight-security product (block 1720). If there is another set (block 1720: YES), then process 1700 may return to block 1714. If there is no more set for which SHC unit 118 is to evaluate a health-weight product or a health-weight-security product (block 1720: NO), the process 1700 may proceed to block 1722, which is shown in FIG. 17B.

Referring to FIG. 17B, at block 1722, SHC unit 118 may adjust the evaluated sum, if the E-LAN service topology was selected, by multiplying the result from block 1718 by the health and its weight associated with an EVC, as shown in expression (13) or (14). Next, SHC unit 118 may adjust a result of the multiplication by dividing the result by the total number of sets for which SHC unit 118 performed blocks 1716 and 1718 (block 1722). The total number of sets for an E-Line service is S=N, where N is the number of UNIs as shown in expression (11) and (12). SHC unit 118 may provide the computed health metrics to user device 102, performance management system1 112, and/or fault management system 114.

Process 1700 may further include comparing the result of block 1720 to an appropriate threshold (block 1724). For example, system 112/114 may compare a health metric provided by SHC unit 118 to a threshold T. If the result>T (block 1726: YES), which indicates that the service is healthy, process 1700 may terminate or proceed to determine more health metrics, by performing one or more of the actions indicated in blocks 1702-1724 (block 1728). If the result is not>T (block 1726: NO), which indicates that the service is not healthy, system 112/114 may alert a user, a partner or a service administrator via internal and/or external APIs or service portals (block 1730). Depending on the implementation, system 112/114 may initiate a repair, a recovery, a fix, and/or performance optimization (e.g., reconfigure service resources such as switching to a backup connection and increasing CPU power for applications) for the service. Process 1700 may further include evaluating additional health metrics (block 1732). Process 1700 may be repeated periodically or be performed periodically, on-demand, or in real time.

Figure 18A:
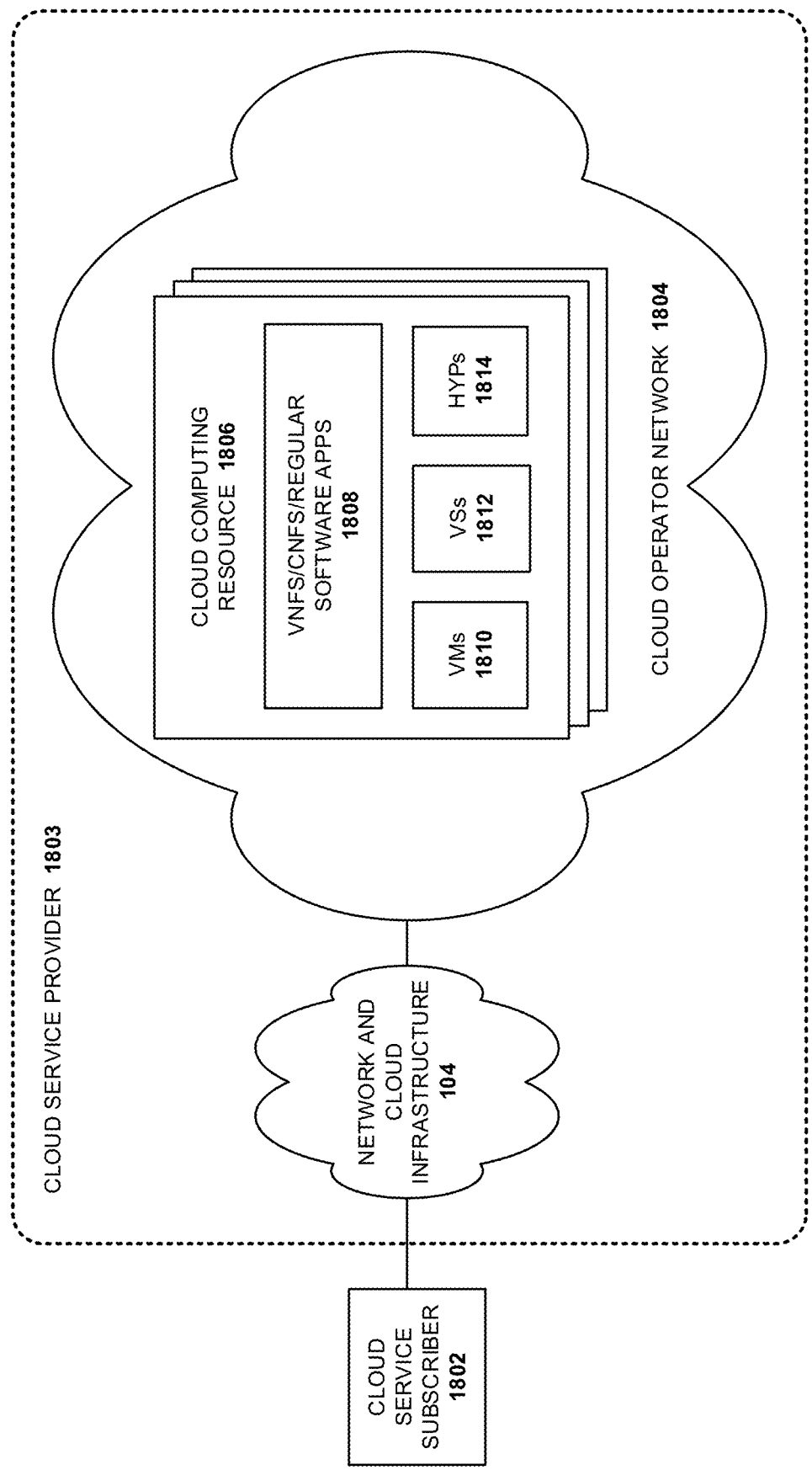
FIG. 18A illustrates an example environment in which various services may be provided.

FIG. 18A illustrates an example environment 1800 in which services that may be represented by service topologies may be provided. As shown in FIG. 18A, environment 1800 may include one or more of cloud service subscriber 1802 and a cloud service provider 1803. Cloud service provider 1803 may provide network 104 and cloud operator network 1804. Devices of environment 1800 may be interconnected via wired connections, wireless connections, optical connections (e.g., optical fibers), or a combination of wired, wireless, and/or optical connections.

Cloud service subscriber 1802 may include one or more devices capable of receiving, generating, storing, processing, and/or providing information, such as information described herein. For example, cloud service subscriber 1802 may include a user device 102 (e.g., a smart phone, a radiotelephone, and/or the like), a laptop computer, a tablet computer, etc. In some implementations, cloud service subscriber 1802 may receive information from and/or transmit information to cloud service provider 1803.

Cloud service provider 1803 may provide one or more devices that support cloud services. The devices may provide for connectivity and application interfaces in a cloud service provider infrastructure (not shown). In some implementations, the cloud service provider infrastructure may receive information from and/or transmit information to one or more cloud service subscribers 1802.

Cloud operator network 1804 may be implemented on a cloud operator infrastructure. The cloud operator infrastructure may provide computation, software, data access, storage, and/or other services that do not require end-user knowledge of a physical location and configuration of systems and/or devices that host cloud applications. The cloud operator infrastructure may include a group of cloud computing resources 1806 (referred to collectively as computing resources 1806 and generically as computing resource 1806), on which cloud applications may be implemented.

Computing resource 1806 may include one or more computers, workstations, mainframe devices, or other types of computation and/or communication devices. Computing resources 1806 may include program instances executing on devices, storage devices, data transfer devices, etc. In some implementations, computing resource 1806 may communicate with other computing resources 1806 via wired connections, wireless connections, optical connections, or a combination of wired, wireless, and optical connections.

As further shown in FIG. 18A, each computing resource 1806 may include one or more VNFs/CNFs/Regular Software Applications 1808, virtual machines (VMs) 1810, virtualized storage (VSs) 1812, and hypervisors (HYPs) 1814. Depending on the implementation, each computing resource 1806 may include additional, fewer, or different components than those illustrated in FIG. 18A. VNFs/CNFs/Regular Software Applications 1808 may include one or more software applications and/or cloud infrastructure components that may be provided to or accessed by other devices.

Virtual machine 1810 may include software that emulates a physical computer and/or an operating system. Virtual machine 1810 may include containers. Virtualized storage 1812 may include storage systems and/or devices that use virtualization techniques within the storage systems. Virtual storage 1812 may implement, for example, block virtualization and file virtualization. Hypervisor 1814 may apply hardware virtualization techniques to create and/or manage virtual machines. Hypervisor 1814 may present a virtual operating platform to the guest operating systems and may manage the execution of the guest operating systems.

Network 104 has been described above with reference to FIG. 1. In FIG. 18A, network 104 may take the form of an access network through which cloud service subscriber 1802 may access cloud service provider network 1804 to receive its services. For example, network 104 may include a WI-FI® network, a wireless network, a PSTN, etc.

The number and arrangement of devices and cloud computing resources 1806 shown in FIG. 18A are provided as examples. In practice, there may be additional devices and/or networks and computing resources 1806, fewer devices and/or networks and computing resources 1806, different devices and/or networks, or differently arranged devices and/or networks and computing resources 1806 than those shown in FIG. 18A. Furthermore, two or more devices shown in FIG. 18A may be implemented within a single device, or a single device shown in FIG. 18A may be implemented as multiple, distributed devices. Additionally, or alternatively, a set of devices (e.g., one or more devices) of environment 1800 may perform one or more functions described as being performed by another set of devices of environment 1800.

Figure 18B:
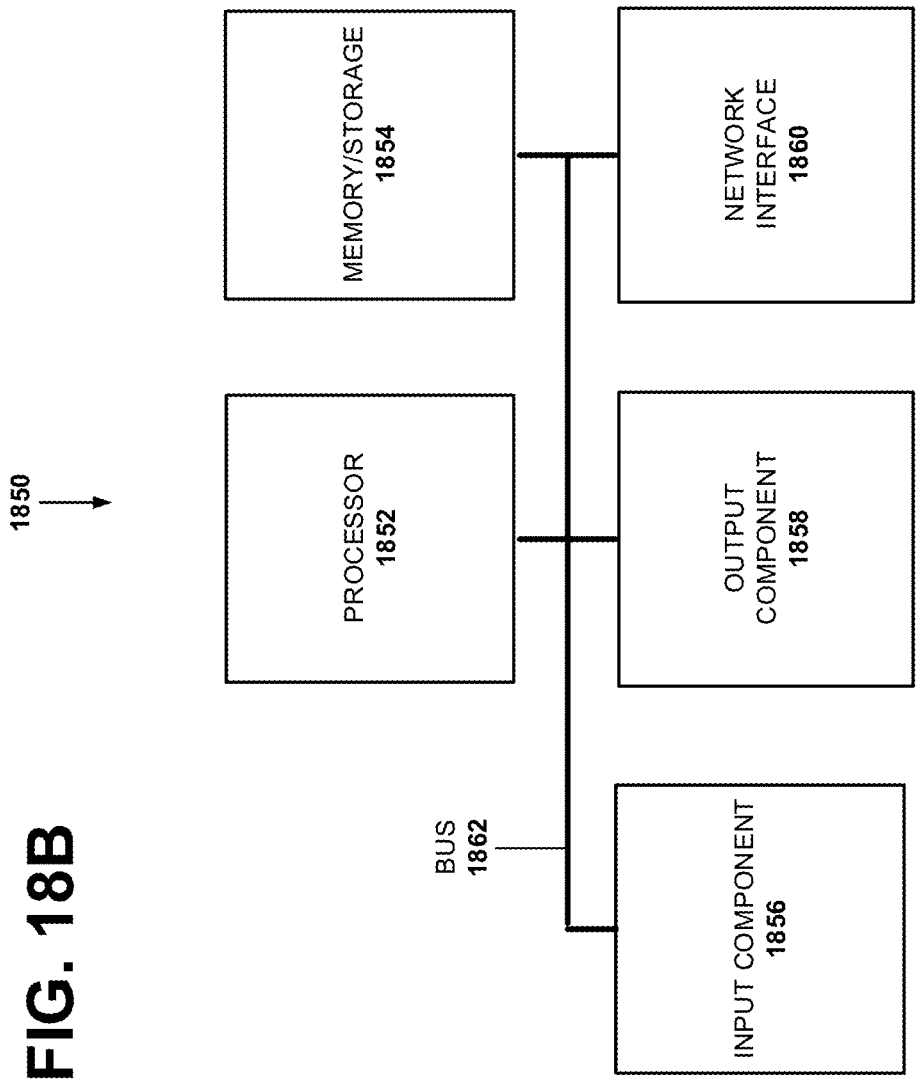
FIG. 18B is a block diagram illustrating exemplary components of a network device.

FIG. 18B depicts exemplary components of an exemplary network device 1850. Network device 1850 corresponds to or is included in user device 102, monitoring system 106, orchestrator 108, inventory system 110, performance management system 112, fault management system 114, host devices for SHC unit 118, UNIs, ENNIs, RE components, SCI components, ONTs, load balancers, nodes, routers, switches, and/or any of the network components of FIGS. 1-5 and 7-16, and 18A. As shown, network device 1850 includes a processor 1852, memory/storage 1854, input component 1856, output component 1858, network interface 1860, and bus 1862. In different implementations, network device 1850 may include additional, fewer, different components than the ones illustrated in FIG. 18B.

Processor 1852 may include a processor, a microprocessor, an Application Specific Integrated Circuit (ASIC), a Field Programmable Gate Array (FPGA), a programmable logic device, a chipset, an application specific instruction-set processor (ASIP), a system-on-chip (SoC), a central processing unit (CPU) (e.g., one or multiple cores), a microcontroller, and/or another processing logic device (e.g., embedded device) capable of controlling network device 1850 and/or executing programs/instructions.

Memory/storage 1854 may include static memory, such as read only memory (ROM), and/or dynamic memory, such as random access memory (RAM), or onboard cache, for storing data and machine-readable instructions (e.g., programs, scripts, etc.).

Memory/storage 1854 may also include a CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 1854 may be external to and/or removable from network device 1850. Memory/storage 1854 may include, for example, a Universal Serial Bus (USB) memory stick, a dongle, a hard disk, off-line storage, a Blu-Ray® disk (BD), etc. Depending on the context, the term "memory," "storage," "storage device," "storage unit," and/or "medium" may be used interchangeably. For example, a "computer-readable storage device" or "computer-readable medium" may refer to both a memory and/or storage device.

Input component 1856 and output component 1858 may provide input and output from/to a user to/from network device 1850. Input and output components 1856 and 1858 may include, for example, a display screen, a keyboard, a mouse, a speaker, actuators, sensors, gyroscope, accelerometer, a microphone, a camera, a DVD reader, Universal Serial Bus (USB) lines, and/or other types of components for obtaining, from physical events or phenomena, to and/or from signals that pertain to network device 1850.

Network interface 1860 may include a transceiver (e.g., a transmitter and a receiver) for network device 1850 to communicate with other devices and/or systems. For example, via network interface 1860, network device 1850 may communicate with access station 210. Network interface 1860 may include an Ethernet interface to a LAN, and/or an interface/connection for connecting network device 1850 to other devices (e.g., a Bluetooth interface). For example, network interface 1860 may include a wireless modem for modulation and demodulation.

Bus 1862 (also called a communication path) may enable components of network device 1850 to communicate with one another.

Network device 1850 may perform the operations described herein in response to processor 1852 executing software instructions stored in a non-transient computer-readable medium, such as memory/storage 1854. The software instructions may be read into memory/storage 1854 from another computer-readable medium or from another device via network interface 1860. The software instructions stored in memory or storage (e.g., memory/storage 1854, when executed by processor 1852, may cause processor 1852 to perform processes that are described herein.

In this specification, various preferred embodiments have been described with reference to the accompanying drawings. Modifications may be made thereto, and additional embodiments may be implemented, without departing from the broader scope of the invention as set forth in the claims that follow. The specification and drawings are accordingly to be regarded in an illustrative rather than restrictive sense. For example, while a series of blocks have been described above with regard to the process illustrated in FIGS. 17A and 17B, the order of the blocks may be modified in other implementations. In addition, non-dependent blocks may represent actions can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store, or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A system comprising:
an application, which is hosted on a device, configured to:
receive a selection of a health metric and a selection of a service topology associated with a service provided by a network to a subscriber device, wherein the service topology is associated with a number of pair of nodes;
receive configuration information for evaluating the selected health metric for the service topology;
receive monitored health information from a network device;
evaluate one or more health-weight products or health-weight-security products for the selected health metric and the service topology based on the received monitored health information;
obtain a health of the service score, wherein the health of the service sore is a normalized value comprising a sum of the evaluated health-weight products or the health-weight security products divided by a number of pair of nodes associated with the service;
compare the health of the service score to a threshold; and
send an alert or initiate a fix for the service when the sum is greater than the threshold.

2. The system of claim 1, wherein the health-weight-security product includes a product of terms comprising:
a connectivity transport health of a cloud;
a first weight indicative of importance of the connectivity transport health;
a connectivity transport security health of the cloud;
a second weight indicative of importance of the connectivity transport security health;
a health of an application on the cloud;
a third weight indicative of importance of the health of the application on the cloud;
an application security health of the application on the cloud; and
a fourth weight indicative of importance of the application security health.

3. The system of claim 1, wherein the network includes a core IP/Multi-protocol Label Switching (MPLS) network and a passive optical network (PON).

4. The system of claim 1, wherein the service topology includes an Ethernet virtual connection (EVC) that comprises one or more operator virtual connections (OVCs).

5. The system of claim 1, wherein the service topology includes information that specifies one or more of:
an endpoint associated with a node;
a device associated with a node;
an application associated with a node; or
a type of connection or an application flow between two nodes.

6. The system of claim 1, wherein the service topology includes information that indicates, for a node in the service topology:
an on-net location; and
an off-net location.

7. The system of claim 1, wherein the health-weight product includes a product of a value of health metric, included in the monitored health information, and a weight that indicates relative importance of the health metric.

8. The system of claim 7, wherein the health-weight-security product includes a product of:
a value of a security health metric, included in the monitored health information;
a weight that indicates relative importance of the security health metric; and
the health weight product.

9. A method comprising:
receiving a selection of a health metric and a selection of a service topology associated with a service provided by a network to a subscriber device, wherein the service topology is associated with a number of pair of nodes;
receiving configuration information for evaluating the selected health metric for the service topology;
receiving monitored health information from a network device;
evaluating one or more health-weight products or health-weight-security products for the selected health metric and the service topology based on the received monitored health information;
obtaining a health of the service score, wherein the health of the service sore is a normalized value comprising a sum of the evaluated health-weight products or the health-weight security products divided by a number of pair of nodes associated with the service;
comparing the health of the service score to a threshold; and
sending an alert or initiating a fix for the service when the sum is greater than the threshold.

10. The method of claim 9, wherein the health-weight-security product includes a product of terms comprising:
a connectivity transport health of a cloud;
a first weight indicative of importance of the connectivity transport health;
a connectivity transport security health of the cloud;
a second weight indicative of importance of the connectivity transport security health;
a health of an application on the cloud;
a third weight indicative of importance of the health of the application on the cloud;
an application security health of the application on the cloud; and
a fourth weight indicative of importance of the application security health.

11. The method of claim 9, wherein the network includes a core IP/Multi-protocol Label Switching (MPLS) network and a passive optical network (PON).

12. The method of claim 9, wherein the service topology includes an Ethernet virtual connection (EVC) that comprises one or more operator virtual connections (OVCs).

13. The method of claim 9, wherein the service topology includes information that specifies one or more of:
an endpoint associated with a node;
a device associated with a node;
an application associated with a node; or
a type of connection or an application flow between two nodes.

14. The method of claim 9, wherein the service topology includes information that indicates, for a node in the service topology:
an on-net location; and
an off-net location.

15. The method of claim 9, wherein the health-weight product includes a product of a value of health metric, included in the monitored health information, and a weight that indicates relative importance of the health metric.

16. A non-transitory computer-readable medium comprising one or more processor executable instructions, which, when executed by one or more processors, cause the one or more processors to:
- receive a selection of a health metric and a selection of a service topology associated with a service provided by a network to a subscriber device, wherein the service topology is associated with a number of pair of nodes;
- receive configuration information for evaluating the selected health metric for the service topology;
- receive monitored health information from an agent device;
- evaluate one or more health-weight products or health-weight-security products for the selected health metric and the service topology based on the received monitored health information;
- obtain a health of the service score, wherein the health of the service sore is a normalized value comprising a sum of the evaluated health-weight products or the health-weight security products divided by a number of pair of nodes associated with the service;
- compare the health of the service score to a health threshold; and
- send an alert or initiating a fix for the service when the sum is greater than the threshold.

17. The non-transitory computer-readable medium of claim 16, wherein the health-weight-security product includes a product of terms comprising:
- a connectivity transport health of a cloud;
- a first weight indicative of importance of the connectivity transport health;
- a connectivity transport security health of the cloud;
- a second weight indicative of importance of the connectivity transport security health;
- a health of an application on the cloud;
- a third weight indicative of importance of the health of the application on the cloud;
- an application security health of the application on the cloud; and
- a fourth weight indicative of importance of the application security health.

18. The non-transitory computer-readable medium of claim 16, wherein the network includes a core IP/Multi-protocol Label Switching (MPLS) network and a passive optical network (PON).

19. The non-transitory computer-readable medium of claim 16, wherein the health-weight product includes a product of a value of health metric, included in the monitored health information, and a weight that indicates relative importance of the health metric.

20. The non-transitory computer-readable medium of claim 19, wherein the health-weight-security product includes a product of:
- a value of a security health metric, included in the monitored health information;
- a weight that indicates relative importance of the security health metric; and
- the health weight product.

* * * * *